US012505845B1

(12) United States Patent
Caven, III et al.

(10) Patent No.: US 12,505,845 B1
(45) Date of Patent: Dec. 23, 2025

(54) ARTIFICIAL INTELLIGENCE MODELING FOR AN AUDIO ANALYTICS SYSTEM

(71) Applicant: VoxEQ, Inc., Jacksonville, FL (US)

(72) Inventors: John W. Caven, III, Jacksonville, FL (US); Christopher K. Eveland, Nashville, TN (US)

(*) Notice: Subject to any disclaimer, the term of this patent is extended or adjusted under 35 U.S.C. 154(b) by 0 days.

(21) Appl. No.: 18/750,332

(22) Filed: Jun. 21, 2024

(51) Int. Cl.
*G10L 17/26* (2013.01)
*G10L 17/04* (2013.01)

(52) U.S. Cl.
CPC .............. *G10L 17/26* (2013.01); *G10L 17/04* (2013.01)

(58) Field of Classification Search
CPC ................................ G10L 17/26; G10L 17/04
USPC ......................................................... 704/270
See application file for complete search history.

(56) References Cited

U.S. PATENT DOCUMENTS

| | | | |
|---|---|---|---|
| 10,529,328 B2 | 1/2020 | Singh | |
| 11,538,472 B2 | 12/2022 | Singh | |
| 11,568,864 B2 | 1/2023 | Singh | |
| 11,954,258 B1* | 4/2024 | Agrawal | G06F 3/167 |
| 11,965,859 B1* | 4/2024 | Jenkins | G01N 29/2437 |
| 12,243,511 B1* | 3/2025 | Joly | G10L 13/033 |
| 2003/0233235 A1* | 12/2003 | Park | G06F 40/268 704/257 |
| 2013/0268240 A1* | 10/2013 | Thorn | G01D 21/00 702/180 |
| 2016/0307572 A1* | 10/2016 | Avilés-Casco | G10L 15/01 |
| 2019/0098402 A1* | 3/2019 | Zhang | G01S 5/20 |
| 2019/0341058 A1* | 11/2019 | Zhang | G10L 17/10 |
| 2020/0066286 A1* | 2/2020 | Chen | H04R 3/04 |
| 2020/0312336 A1* | 10/2020 | Kang | G06N 3/08 |
| 2021/0052205 A1* | 2/2021 | Schultz | A61B 5/0077 |
| 2021/0063560 A1* | 3/2021 | Bosse | G01S 13/60 |
| 2021/0183358 A1* | 6/2021 | Mao | G10L 17/04 |
| 2021/0249035 A1* | 8/2021 | Bone | G10L 17/04 |
| 2021/0264220 A1* | 8/2021 | Wei | G06N 20/10 |
| 2022/0088346 A1* | 3/2022 | Shin | A61M 21/02 |
| 2022/0148347 A1* | 5/2022 | Nakano | G10L 25/51 |
| 2022/0164667 A1* | 5/2022 | Saki | G06N 3/045 |
| 2022/0208180 A1* | 6/2022 | Eyben | G10L 15/16 |
| 2023/0031145 A1* | 2/2023 | Narayanan | G06V 10/147 |

(Continued)

OTHER PUBLICATIONS

Singh, Rita, Profiling Humans from their Voice, book, 2019, 1st Edition, Springer Singapore.

(Continued)

*Primary Examiner* — Thuykhanh Le
(74) *Attorney, Agent, or Firm* — Camille A. Wilson; Wilson Dutra, PLLC

(57) ABSTRACT

The present disclosure provides for an audio analytics system that utilizes artificial intelligence. The audio analytics system may comprise one or more training sources. In some aspects, the audio analytics system may comprise at least one artificial intelligence infrastructure that may be configured to implement one or more AI models that may be trained via one or more machine learning processes that may enable the audio analytics system to identify one or more potential origin characteristics of an origin of at least one audio source based on training data derived from the training sources. Once trained, the audio analytics system may be configured to identify one or more potential origin characteristics of an origin of an audio source by executing at least one operation on the audio source.

20 Claims, 9 Drawing Sheets

(56) References Cited

U.S. PATENT DOCUMENTS

| | | | | |
|---|---|---|---|---|
| 2023/0096119 A1* | 3/2023 | Gernoth | ................ | G06V 20/64 |
| | | | | 345/420 |
| 2023/0237990 A1* | 7/2023 | Wu | ................ | G06N 3/08 |
| | | | | 704/232 |
| 2023/0240922 A1* | 8/2023 | Rao | ................ | A61B 5/4815 |
| | | | | 5/658 |
| 2023/0260501 A1* | 8/2023 | Trueba | ................ | G10L 15/08 |
| | | | | 704/200 |
| 2023/0260521 A1* | 8/2023 | Slocum | ................ | G10L 17/04 |
| | | | | 704/232 |
| 2023/0260531 A1* | 8/2023 | Srivastava | ............ | G10L 21/028 |
| | | | | 704/233 |
| 2023/0377561 A1* | 11/2023 | Zeghidour | ............ | G10L 15/02 |
| 2023/0401387 A1* | 12/2023 | Alexander | ............ | G06F 40/30 |
| 2023/0412686 A1* | 12/2023 | Mansaray | ............ | G06N 3/045 |
| 2024/0029756 A1* | 1/2024 | Goh | ............ | G10L 21/0208 |
| 2024/0046932 A1* | 2/2024 | Opp | ............ | G10L 15/005 |
| 2024/0073219 A1* | 2/2024 | Maizels | ............ | G06V 10/145 |
| 2024/0144568 A1* | 5/2024 | Gururani | ............ | G06V 10/82 |
| 2024/0192645 A1* | 6/2024 | Seo | ............ | G06T 7/001 |
| 2024/0193759 A1* | 6/2024 | Seo | ............ | G06T 7/0004 |
| 2024/0252107 A1* | 8/2024 | Lee | ............ | A61B 5/7203 |
| 2024/0265926 A1* | 8/2024 | Mann | ............ | G10L 25/30 |
| 2024/0304190 A1* | 9/2024 | Lee | ............ | G06N 3/045 |
| 2024/0321281 A1* | 9/2024 | Laroche | ............ | G10L 19/08 |
| 2024/0324838 A1* | 10/2024 | Ebrahimi Afrouzi | ............ | |
| | | | | G05D 1/2446 |
| 2024/0363247 A1* | 10/2024 | Attia | ............ | G16H 50/30 |
| 2025/0030551 A1* | 1/2025 | Ott | ............ | G06F 21/32 |

OTHER PUBLICATIONS

Singh, Rita, Deriving Vocal Fold Oscillation Information from Recorded Voice Signals Using Models of Phonation, journal, 2023, vol. 25, Basel, Switzerland.

\* cited by examiner

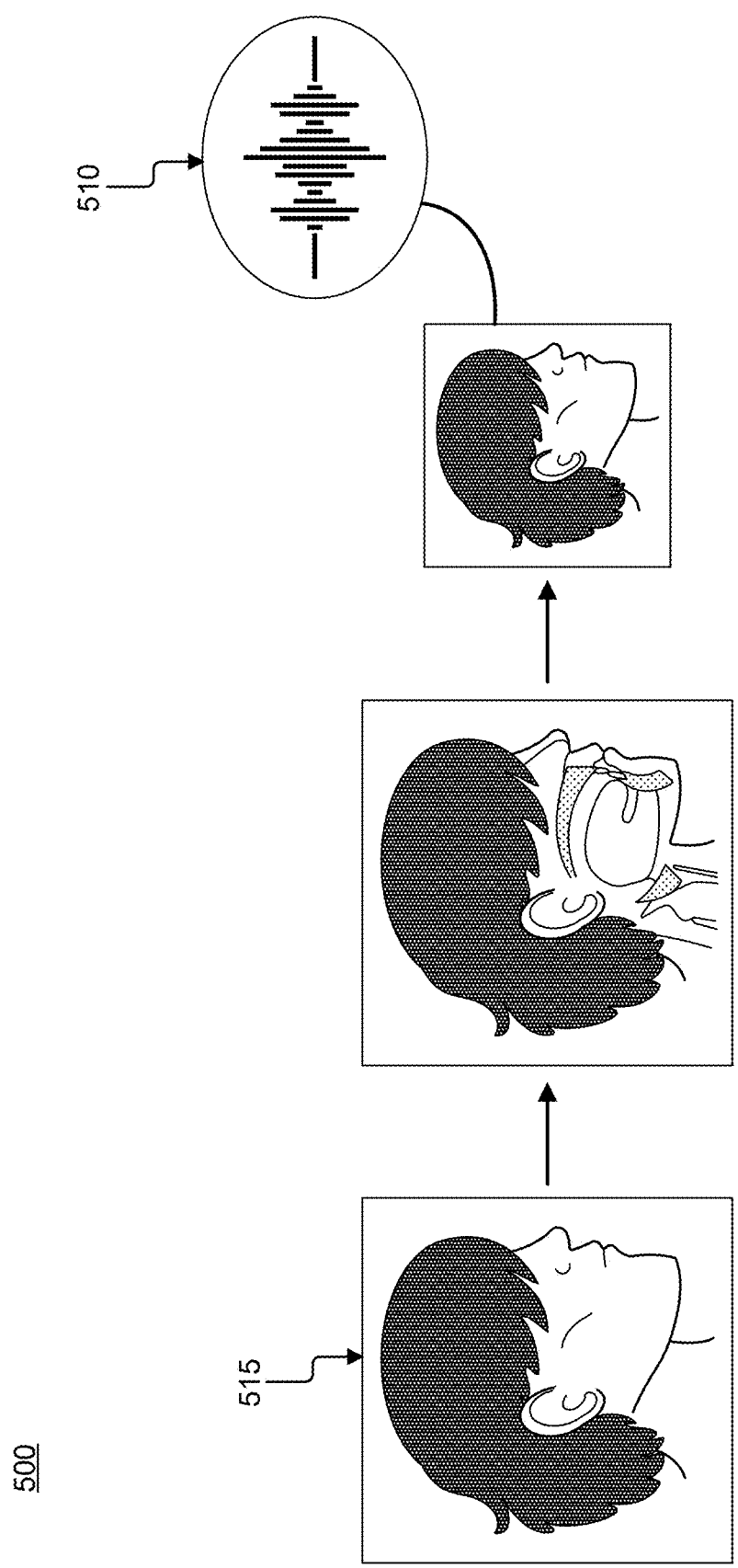

ARTIFICIAL INTELLIGENCE MODELING FOR AN AUDIO ANALYTICS SYSTEM

BACKGROUND

Artificial intelligence ("AI") is the creation of machines that replicate human intelligence, though nowadays, these technologies often outperform human ability, processing large amounts of data at speeds much faster than humans are able. As AI technologies and algorithms have evolved, they have come to improve various aspects of the human experience, reducing the tedious labor associated with many everyday tasks and assignments.

Although the implementation of AI generally makes human life easier, the development of AI systems is quite complex. For instance, an AI application is not readily usable immediately after it has received its mathematical instructions or algorithms. Rather, the AI technology must be trained to properly use these algorithms. AI training typically requires using collected data to optimize the algorithm. Depending on the quality and quantity of the collected data being used to train the AI, the accuracy with which the AI applies the data will vary.

The program that results from training the AI algorithms is called an AI Model. The trained algorithm learns from its received data, working to recognize various types of patterns. AI Models represent those numbers, rules, and other data structures, existing as the output of an AI algorithm, to support advanced analytics. Once an AI Model has been adequately trained, it is able to draw inferences, making logical conclusions based on new, relevant data. AI Models can be designed and trained to generate new data, understand data, and automate tasks. One field that benefits from the utilization of AI Models is audio analytics, the task of identifying audio and translating it to a format that can be analyzed and broken down into usable data.

Audio analytics involves capturing audio signals with digital devices, using the signals to extract verbal cues, understanding the contents and source of the audio, and searching audio data based on specific features or characteristics. AI Models tailored for audio analytics have started to delve into emotion recognition, analyzing a person's speech with the goal of predicting and understanding emotion. Unfortunately, this sort of technology is incredibly difficult to program as every human has a different way of expressing emotions.

While AI technologies have been successful in forming models that create and predict outputs based on received audio data, their capabilities have yet to be fully developed. Current technology can analyze audio and source it with a decent degree of accuracy; however, its ability to understand other features of the speaker or other audio source is limited.

SUMMARY OF THE DISCLOSURE

What is needed are systems and methods for analyzing one or more audio sources via artificial intelligence. Systems and methods that utilize AI models that facilitate the identification of one or more potential origin characteristics of at least one origin of one or more audio sources are also desired.

The present disclosure provides for an audio analytics system and associated methods that may use data-based aspects of one or more sound waves to identify one or more potential origin characteristics for at least one audio source comprising the sound waves. In some aspects, the audio analytics system may be configured to utilize one or more artificial intelligence ("AI") models that may trained via one or more machine learning ("ML") processes, wherein once trained, the audio analytics system may be configured to identify one or more potential origin characteristics of an origin of the audio source based at least partially on previously stored or previously received training data.

In some implementations, the audio analytics system of the present disclosure may comprise at least one audio capture device. In some non-limiting exemplary embodiments, the audio capture device may be configured to receive at least one audio source such that the audio analytics system may execute at least one operation on the audio source. In some implementations, the audio capture device may be communicatively coupled to at least one artificial intelligence infrastructure. In some non-limiting exemplary embodiments, the audio capture device may comprise at least one artificial intelligence infrastructure. In some aspects, the artificial intelligence infrastructure may be configured to at least partially execute the at least one operation on the received audio source. In some implementations, the artificial intelligence infrastructure may be stored within one or more external or remote computing devices or servers that may be communicatively coupled to the audio capture device via at least one network connection.

By way of example and not limitation, the at least one network connection may comprise a connection to the global, public Internet or a private local area network ("LAN"). In some non-limiting exemplary embodiments, the artificial intelligence infrastructure may be stored within one or more external or remote computing devices or servers that may be communicatively coupled to the audio capture device directly without any network connection, such as, for example and not limitation, in a disconnected edge computing environment. By way of further example and not limitation, in some aspects, the artificial intelligence infrastructure may comprise at least one of: a neural network, a deep neural network, a convolutional neural network, or a support vector machine.

In some aspects, the audio analytics system of the present disclosure may be configured to identify or determine one or more audio characteristics of the received audio source(s). In some implementations, the audio characteristic(s) may be identified via execution of a first at least one operation on the received audio source(s) and a second at least one operation may be executed on the identified audio characteristic(s) to identify the potential origin characteristic(s) associated with the origin(s) of the audio source(s). In some embodiments, the audio characteristics of the audio source may be determined via one or more analytical processes that may be at least partially facilitated by one or more algorithms or software instructions. In some aspects, the audio analytics system may be configured to execute at least one operation directly on the received audio source(s) to identify the potential origin characteristic(s) of the origin(s) of the audio source(s).

In some non-limiting exemplary embodiments, a first at least one operation may be at least partially executed an a received audio source via a first artificial intelligence infrastructure utilizing a first set of one or more parameters and a second at least one operation may be at least partially executed by a second artificial intelligence infrastructure utilizing a second set of one or more parameters. In some implementations, the first and the second at least one operation may be at least partially executed by the same artificial intelligence infrastructure using the same or different sets of one or more parameters. In some aspects, execution of the first at least one operation may identify one or more audio characteristics of the audio source or a first set of one or more potential origin characteristics of the origin of the audio source, while execution of the second at least one operation may identify a first or second set of one or more potential origin characteristics of the origin of the audio source.

In some implementations, the artificial intelligence infrastructure of the audio analytics system of the present disclosure may be at least partially trained using an amount of training data, wherein the amount of training data may be derived from a plurality of training sources, wherein each of the plurality of training sources may comprise at least one type or form of sound or audio that comprises one or more sound waves. In some non-limiting exemplary embodiments, the artificial intelligence infrastructure may comprise at least three layers, wherein each layer may comprise one or more nodes. By way of example and not limitation, the artificial intelligence infrastructure may comprise at least one input layer, at least one output layer, and one or more hidden intermediate layers. In some aspects, the nodes of one layer may be connected to the nodes of an adjacent layer via one or more channels. In some implementations, each channel may be assigned a numerical value, or weight. In some embodiments, each node within the one or more intermediate layers may be assigned a numerical value, or bias. Collectively, the weights of the channels and the biases of the nodes may comprise one or more parameters of the audio analytics system.

In some aspects, the training data may be received by the input layer of the artificial intelligence infrastructure. In some implementations, the audio analytics system may then execute one or more operations on the training data as the training data is propagated through the one or more intermediate layers, wherein the one or more operations may incorporate the parameters of the audio analytics system during execution. In some embodiments, once the training data reaches the output layer of the artificial intelligence infrastructure, one or more potential origin characteristics associated with the training data may be identified.

In some implementations, the audio analytics system of the present disclosure may be trained via at least one semi-supervised machine learning process. In some aspects, the semi-supervised machine learning process may utilize one or more pseudo-labeling techniques. In some non-limiting exemplary embodiments, each potential origin characteristic identified for the training data received by the audio analytics system may be compared to at least one of: a known (or labeled) origin characteristic for the training data and an estimated (or pseudo-labeled) origin characteristic of the training data. In some aspects, this comparison may allow the audio analytics system to determine if each identified potential origin characteristic of the training data is accurate or inaccurate.

In some implementations, if an identified potential origin characteristic is determined to be inaccurate, the audio analytics system may perform one or more calculations to assess the degree or nature of the inaccuracy. In some aspects, the data resulting from this assessment may be directed back through the artificial intelligence infrastructure via at least one backpropagation algorithm. In some non-limiting exemplary embodiments, the at least one backpropagation algorithm may adjust the one or more weights, biases, or other parameters of the audio analytics system to generate more accurate results for subsequently received training data obtained from one or more training sources. In some aspects, the utilization of at least one semi-supervised machine learning process may enable the audio analytics system to process a greater amount of training data from more training sources.

In some aspects, at least a portion of the training data derived from the training sources received by the audio analytics system may be at least partially augmented. In some non-limiting exemplary embodiments, augmenting the training data may at least partially comprise replicating and applying one or more audio quality influencers to the training sources, wherein the audio quality influencers may comprise one or more factors that may affect the quality of an audio source. By way of example and not limitation, an audio quality influencer may comprise compression applied to audio sources transmitted via at least one cellular telephone system or one or more user communication services operating on one or more mobile computing devices (such as the WhatsApp® service available from Meta of Menlo Park, CA, a social media network, or a virtual gaming environment, as non-limiting examples).

In some implementations, the determination of the accuracy of the one or more potential origin characteristics identified for each training source received by the audio analytics system of the present disclosure may at least partially comprise the execution of at least one loss function. In some aspects, the at least one loss function may be configured to simultaneously determine classification loss and regression loss for each identified potential origin characteristic such that the audio analytics system may be trained to accurately predict at least one class and/or at least one distribution range for one or more of the potential origin characteristics. In some non-limiting exemplary embodiments, the at least one loss function may at least partially comprise at least one linear quadratic estimation algorithm.

In some implementations, the audio analytics system of the present disclosure may be configured to determine and present one or more scores describing a quantified accuracy approximation of one or more results, such as, for example and not limitation, one or more identified potential origin characteristics produced by the audio analytics system. In some aspects, by way of example and not limitation, each score may comprise a numerical value, percentage, or Gaussian distribution representing a calculated estimated accuracy of the one or more identified potential origin characteristics.

In some implementations, the audio analytics system of the present disclosure may comprise at least one visual capture device configured to capture one or more visual sources, wherein the visual source(s) may comprise one or more images associated with or representative of one or more origins of one or more audio sources. In some non-limiting exemplary embodiments, the audio analytics system may be configured to match the one or more visual sources with one or more origins, and vice versa.

BRIEF DESCRIPTION OF THE DRAWINGS

The accompanying drawings that are incorporated in and constitute a part of this specification illustrate several embodiments of the disclosure and, together with the description, serve to explain the principles of the disclosure:

FIG. 5 illustrates an exemplary audio analytics system, according to some embodiments of the present disclosure.

Figure 1:
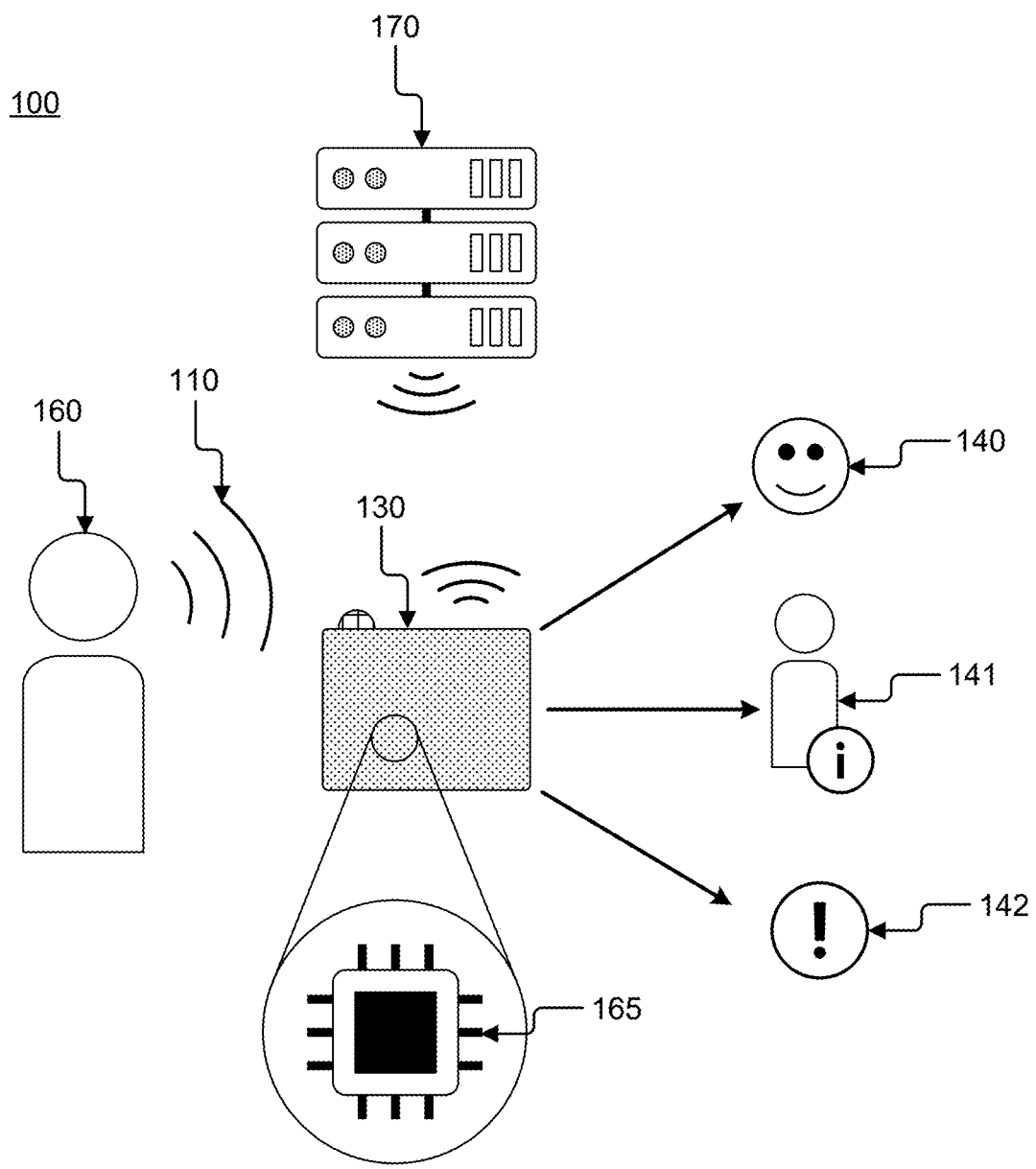
FIG. 1 illustrates an exemplary audio analytics system, according to some embodiments of the present disclosure.

The Figures are not necessarily drawn to scale, as their dimensions can be varied considerably without departing from the scope of the present disclosure.

DETAILED DESCRIPTION

In the following sections, detailed descriptions of examples and methods of the disclosure will be given. The descriptions of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Audio Characteristic: as used herein refers to at least one aspect of an audio source. In some aspects, an audio characteristic may comprise volume, tone, rhythm, inflection, pitch, base, frequency, or one or more image processing analytics, as non-limiting examples.

Origin Characteristic: as used herein refers to at least one physical, mental, or emotional characteristic associated with an origin of at least one audio source. In some aspects, an origin characteristic may comprise an age, age range, height, weight, gender, sex, hormonal development, race, ethnicity, species, breed, identification, emotional state, mental state, fatigued status, or level of neurological impairment of an origin, as non-limiting examples.

Audio Source: as used herein refers to any auditory sound emitted by at least one origin, wherein an origin may comprise the originator of the auditory sound. In some non-limiting exemplary embodiments, an audio source may comprise an animal vocalization. In some aspects, by way of example and not limitation, an audio source may comprise a previously emitted auditory sound stored within at least one storage medium. In some aspects, by way of further example and not limitation, an audio source may at least partially comprise a live audio stream.

Audio Capture Device: as used herein refers to any device used to capture or receive at least one audio source. By way of example and not limitation, an audio capturing device may comprise a microphone, camera, or a recording device.

Operation: as used herein refers to any action that may be executed on at least one audio source by at least one computing device. By way of example and not limitation, an operation may comprise any function, process, procedure, algorithm, artificial intelligence application, or machine learning process that may be used to at least partially analyze at least one audio source. By way of further example and not limitation, an operation may be executed during the performance of a neural network or support vector machine.

Parameter: as used herein refers to any element that may influence an operation executed by at least one computing device. In some aspects, a parameter may comprise one or more weights, one or more biases, one or more values, and/or one or more inputs.

Embedding: as used herein, refers to a condensed data set comprising one or more origin characteristics at least partially derived from at least one audio source. In some embodiments, an embedding may comprise a resultant data set produced after an audio source is processed by at least one artificial intelligence infrastructure. In some implementations, an embedding may comprise audio source data that excludes information that is irrelevant to any origin characteristics of an origin of an audio source, such as, for example and not limitation, the content of one or more spoken sounds or background noise, as non-limiting examples.

Referring now to FIG. 1, an exemplary audio analytics system 100, according to some embodiments of the present disclosure, is illustrated. In some aspects, the audio analytics system 100 may comprise at least one audio source 110. In some implementations, the audio analytics system 100 may comprise at least one audio capture device 130. In some implementations, the audio analytics system 100 may be configured to identify one or more potential origin characteristics 140, 141, 142 associated with an origin 160 of the audio source 110, wherein the potential origin characteristics 140, 141, 142 may be presented to at least one user of the audio analytics system 100. In some embodiments, the audio capture device 130 may at least partially comprise at least one computing device. In some implementations, the audio capture device 130 may be communicatively coupled to at least one computing device, such as via a wireless connection or a hardwired connection, as non-limiting examples. In some non-limiting exemplary embodiments, the audio capture device 130 may at least partially comprise or may be communicatively coupled to at least one computing device that comprises one or more of: a central processing unit ("CPU"), a graphics processing unit ("GPU"), an edge computing device, a system on a chip, a tensor core, a headset, an on-board vehicle computer, a smartphone, a smart watch, a laptop computer, a tablet computer, a desktop computer, a gaming console, a virtual reality device, an augmented reality device, a smart speaker, or a hearing aid, as non-limiting examples. In some aspects, the audio capture device 130 may comprise at least one of: a peripheral device and a sensing device.

In some implementations, the audio capture device 130 may be configured to receive at least one audio source 110. By way of example and not limitation, the audio capture device 130 may receive the audio source 110 via at least one input element, such as a microphone or network or broadcast connection, as non-limiting examples. In some aspects, the audio analytics system 100 may be configured to execute at least one operation on the audio source 110, wherein execution of the at least one operation may allow the audio analytics system 100 to identify one or more potential origin characteristics 140, 141, 142 associated with an origin 160 of the audio source 110. By way of example and not limitation, potential origin characteristics 140, 141, 142 may comprise a physical, mental, or emotional status associated with the origin 160 of the audio source 110. By way of further example and not limitation, potential origin characteristics 140, 141, 142 may comprise one or more of: an age, an age range, a height, a height range, a length, a length range, a weight, a weight range, a gender, a sex, a hormonal development, a race, an ethnicity, a species, a breed, or an identification of the origin 160 of the audio source 110.

In some aspects, the audio analytics system 100 may comprise at least one storage medium 165. In some non-limiting exemplary embodiments, the storage medium 165 may at least partially comprise an amount of volatile memory for streaming data. In some implementations, the storage medium 165 may comprise one or more parameters that may be used or referenced during the execution of the operations on the audio source 110. In some non-limiting exemplary embodiments, the parameters may comprise one or more weights, biases, or similar values, modifiers, or inputs. In some aspects, at least a portion of the parameters may be adjustable to improve the accuracy of the potential origin characteristics 140, 141, 142 identified for the origin 160 of the audio source 110.

In some implementations, the audio analytics system 100 may comprise at least one artificial intelligence infrastructure. In some non-limiting exemplary embodiments, the artificial intelligence infrastructure may be communicatively coupled to the audio capture device 130. In some implementations, the audio capture device 130 may comprise the artificial intelligence infrastructure. In some aspects, the artificial intelligence infrastructure may be configured to at least partially execute the at least one operation on the audio source 110. In some embodiments, the artificial intelligence infrastructure may be at least partially configured within one or more external or remote computing devices or servers 170 that may be communicatively coupled to the audio capture device 130 via at least one network connection, such as, for example and not limitation, via a connection to the global, public Internet or via a connection to a local area network ("LAN"). In some non-limiting exemplary implementations, the artificial intelligence infrastructure may be stored within one or more external or remote computing devices or servers 170 that may be communicatively coupled to the audio capture device 130 directly without using any network connection, such as, for example and not limitation, in a disconnected edge computing environment. By way of example and not limitation, the artificial intelligence infrastructure may comprise at least one of: a neural network, a deep neural network, a convolutional neural network, or a support vector machine. By way of further example and not limitation, the artificial intelligence infrastructure may be at least partially configured within one or more of: a central processing unit ("CPU"), a graphics processing unit ("GPU"), an edge computing device, a system on a chip, or a tensor core, as non-limiting examples.

In some aspects, the audio analytics system 100 may comprise a plurality of artificial intelligence infrastructures. In some non-limiting exemplary embodiments, the audio analytics system 100 may comprise a first artificial intelligence infrastructure and a second artificial intelligence infrastructure. In some implementations, the first artificial intelligence infrastructure may be configured to at least partially execute a first at least one operation on the audio source 110 using a first set of parameters and the second artificial intelligence infrastructure may be configured to at least partially execute a second at least one operation on the audio source 110 using a second set of parameters.

In some embodiments, the first artificial intelligence infrastructure of the audio analytics system 100 may be configured to identify one or more audio characteristics of the audio source 110. In some implementations, the audio characteristics may be identified via a first at least one operation that may be executed on the audio source 110 and a second at least one operation may be executed on the identified audio characteristics of the audio source 110 to identify one or more potential origin characteristics 140, 141, 142 associated with an origin 160 of the audio source 110. In some aspects, at least one operation may be executed directly on the audio source 110 to identify one or more potential origin characteristics 140, 141, 142 without first identifying any audio characteristics. In some implementations, one or more audio characteristics may be identified or determined for the audio source 110 by one or more processes or analytical methods that do not comprise executing at least one operation on the audio source 110. By way of example and not limitation, audio characteristics of the audio source 110 may comprise one or more of: volume, tone, rhythm, inflection, pitch, base, vibrational frequency, image processing analytics, or similar aspects of the audio source 110. By way of further example and not limitation, potential origin characteristics 140, 141, 142 may comprise one or more physical, mental, or emotional features or states of an origin 160 of the audio source 110. In some non-limiting exemplary embodiments, the first at least one operation and the second at least one operation may be executed by the same artificial intelligence infrastructure.

In some embodiments, an audio source 110 may comprise one or more audio characteristics that may be captured by at least one audio capture device 130, wherein the audio characteristics may be identified or determined via the audio analytics system 100. In some aspects, the audio source 110 may comprise audio characteristics of one or more sound waves produced by the vibrations of one or more vocal cords, the sound of air passing in or out of a human or animal mouth or nose during breathing processes, wheezing or coughing sounds associated with the functioning of lungs, a resonance occurring in one or more nasal cavities, or any similar sounds, as non-limiting examples. In some aspects, the audio source 110 may comprise one or more audio characteristics of one or more sound waves that may be directly emitted by a human or animal or one or more reproduced human or animal sounds. By way of example and not limitation, a reproduced sound may comprise one or more live or previously recorded sounds that may be output by at least one audio emitting device instead of being directly emitted from a human or animal. By way of further example and not limitation, in some embodiments, the audio emitting device that produces one or more reproduced sounds may comprise at least one speaker.

As a non-limiting illustrative example, the audio from a conversation between two or more people may be captured, recorded, and processed or analyzed by the audio analytics system 100. In some aspects, the tone, cadence, inflection, and other audio characteristics of the vocal sounds produced by the individuals in the conversation may be captured via at least one audio capture device 130 in the form of, for example and not limitation, a microphone associated with a portable computing device, such as a smartphone or tablet computer that may be proximate to the individuals such that the microphone may be able to detect the conversation.

In some aspects, the audio source 110 may be captured by the audio capture device 130 and used by the audio analytics system 100 to determine at least one potential origin characteristic 140, 141, 142 related to an origin 160 of the audio source 110. By way of example and not limitation, a potential origin characteristic 140, 141, 142 of an origin 160 may comprise one or more of: a physical, mental, or emotional condition of the origin 160 of the audio source 110. By way of further example and not limitation, a potential origin characteristic 140, 141, 142 may comprise at least one of: an age, an age range, a height, a height range, a length, a length range, a weight, a weight range, a gender, a sex, a hormonal development, a race, an ethnicity, a species, a breed, or an identification of the origin 160 of the audio source 110.

As a non-limiting illustrative example, the audio source 110 may comprise a person's voice, which may be captured and processed or analyzed to identify or determine one or more potential origin characteristics 140, 142 regarding the emotional or mental state of the person comprising the origin 160 of the audio source 110. In some implementations, this identification may at least partially comprise the audio analytics system 100 performing or executing at least one operation on the audio source 110. In some aspects, the audio analytics system 100 may comprise at least one storage medium 165, wherein the storage medium 165 may comprise one or more parameters that may be utilized or referenced to at least partially execute the at least one operation on the captured audio source 110. By way of example and not limitation, the parameter(s) within the storage medium 165 may comprise one or more weights, biases, or similar values, modifiers, or inputs that may at least partially influence any resulting output(s) from the at least one operation. In some non-limiting exemplary embodiments, at least a portion of the one or more parameters may be adjustable to modify the accuracy of the potential origin characteristics 140, 141, 142 identified via the execution of the at least one operation on the captured audio source 110.

In some implementations, an audio source 110 may be captured by at least one audio capture device 130. The captured audio source 110 may then be used by the audio analytics system 100 to identify at least one potential origin characteristic 141 associated with the audio source 110. As a non-limiting illustrative example, the audio source 110 may comprise a person's voice, which may be captured and processed or analyzed to identify or determine one or more potential origin characteristics 141 related to the origin 160 of the audio source 110 such as, by way of example and not limitation, one or more physical attributes of the origin 160, i.e., the person speaking. In some embodiments, the audio capture device 130 may comprise at least one storage medium 165, wherein the storage medium 165 may comprise one or more adjustable parameters that may be utilized or referenced during execution of the at least one operation on the captured audio source 110.

In some non-limiting exemplary embodiments, the audio analytics system 100 may comprise one or more parameters that may allow the audio analytics system 100 to identify one or more potential origin characteristics 140, 141, 142 that may be affected by differences in sound waves produced by the vocal cords of humans or animals of different genders, sexes, hormonal developments, ages, heights, lengths, weights, species, breeds, races, or ethnicities, as non-limiting examples, as the length, stiffness, vibrational frequency, and/or resonance of vocal cords may be affected by any or all of these factors, thereby causing the vocal cords of different humans or animals to produce sound waves that differ in at least one aspect. By way of example and not limitation, a human voice may be captured and processed or analyzed to identify potential origin characteristics 140, 141, 142 that indicate that a person is likely a 6'5 tall, 55-year-old male that weighs approximately 200 pounds.

Figure 2:
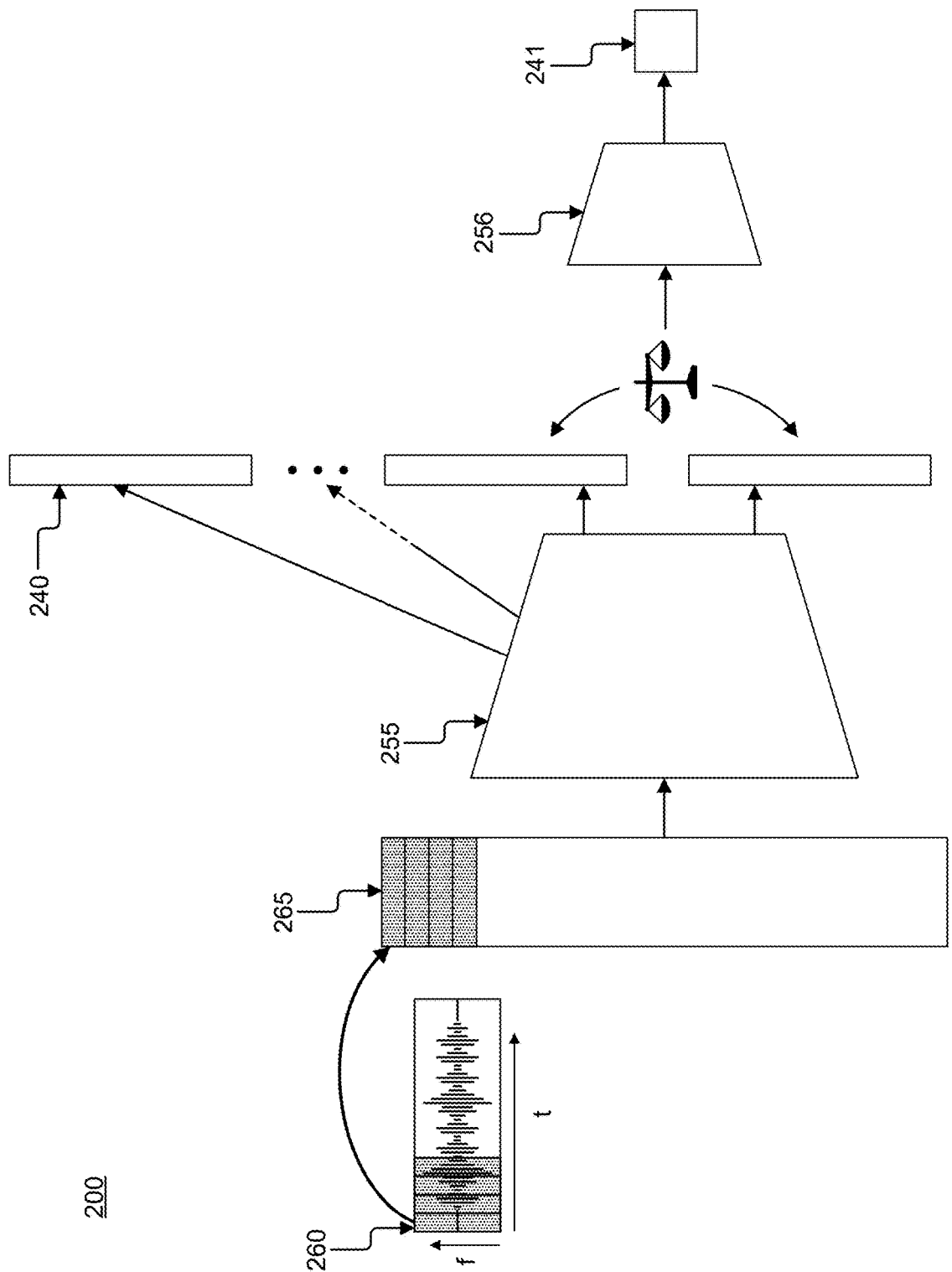
FIG. 2 illustrates an exemplary machine learning process for an audio analytics system, according to some embodiments of the present disclosure.

Referring now to FIG. 2, an exemplary machine learning process 200 for an audio analytics system, according to some embodiments of the present disclosure, is illustrated. In some aspects, the machine learning process 200 may comprise at least one artificial intelligence infrastructure 255, 256 that may be at least partially trained using at least one datum of training data 265, wherein the training data 265 may be derived from a plurality of training sources 260, wherein each of the training sources 260 may comprise at least one type or form of sound or audio that comprises one or more sound waves. In some non-limiting exemplary embodiments, each artificial intelligence infrastructure 255, 256 may comprise at least three layers, wherein each layer may comprise one or more nodes. By way of example and not limitation, each artificial intelligence infrastructure 255, 256 may comprise at least one input layer, at least one output layer, and one or more hidden intermediate layers. In some aspects, the nodes of one layer may be connected to the nodes of an adjacent layer via one or more channels. In some implementations, each channel may be assigned a numerical value, or weight. In some embodiments, each node within the one or more intermediate layers may be assigned a numerical value, or bias. Collectively, the weights of the channels and the biases of the nodes may comprise one or more parameters that may be at least temporarily stored within at least one storage medium.

In some aspects, the training data 265 may be initially received by the input layer of a first artificial intelligence infrastructure 255. In some implementations, the first artificial intelligence infrastructure 255 may then execute one or more operations on the training data 265 as the training data 265 is propagated through one or more intermediate layers, wherein the one or more operations may reference at least a portion of the stored parameters during execution thereof. In some embodiments, once the training data 265 reaches the output layer of the first artificial intelligence infrastructure 255, a first set of one or more potential origin characteristics 240 associated with the training data 265 may be identified, wherein the first set of potential origin characteristics 240 may comprise an embedding. In some implementations, training data 265 may be received by the first artificial intelligence infrastructure 255 from a plurality of training sources 260 contemporaneously, and the first artificial intelligence infrastructure 255 may produce an embedding for each training source 260.

In some implementations, each embedding may be further propagated through a second artificial intelligence infrastructure 256 to identify a second set of one or more potential origin characteristics 241 associated with the training data 265. In some embodiments, the embedding produced by the first artificial intelligence infrastructure 255 may at least partially facilitate the identification of the second set of potential origin characteristics 241 by the second artificial intelligence infrastructure 256, wherein the second set of potential origin characteristics 241 may be more accurately identified by executing one or more operations on the relatively small dimensionality of each embedding compared to the original training sources 260. In some non-limiting exemplary implementations, the first artificial intelligence infrastructure 255 may comprise a convolutional neural network and the second artificial intelligence infrastructure 256 may comprise a multilayer perceptron.

As a non-limiting illustrative example, a plurality of training sources 260 may be received by an audio analytics system, wherein the plurality of training sources 260 may comprise various animal sounds. The training data 265 comprising the animal sounds may be propagated through a first artificial intelligence infrastructure 255, which may execute a first at least one operation on the training data 265 to identify which animal sounds comprise cat sounds, wherein the identification of sounds as being emitted from a cat may comprise an embedding for each training source 260 emitted from a cat, wherein the embedding comprises a first set of potential origin characteristics 240. Each embedding may then be propagated through a second artificial intelligence infrastructure 256, wherein a second at least one operation may be executed on each embedding to identify one or more attributes of the cat emitting the sounds, such as the sex of the cat or whether the cat is hungry, as non-limiting examples, wherein such attributes may comprise a second set of potential origin characteristics 241.

In some non-limiting exemplary embodiments, training data 265 derived from training sources 260 that are similar to the embeddings produced by the first artificial intelligence infrastructure 255 may be propagated through the second artificial intelligence infrastructure 256 to identify one or more potential origin characteristics 241 for such training sources 260. As a non-limiting illustrative example, if the embeddings produced by the first artificial intelligence infrastructure 255 comprise cat sounds, and the second artificial intelligence infrastructure 256 has been trained to identify potential origin characteristics 241 for the cats emitting the sounds, then one or more training sources 260 comprising fox sounds may be processed by the second artificial intelligence infrastructure 256 to identify one or more potential origin characteristics 241 that comprise attributes of the foxes emitting the sounds, wherein the second artificial intelligence infrastructure 256 may transfer the learned identification of potential origin characteristics 241 for cats to foxes.

Figure 3:
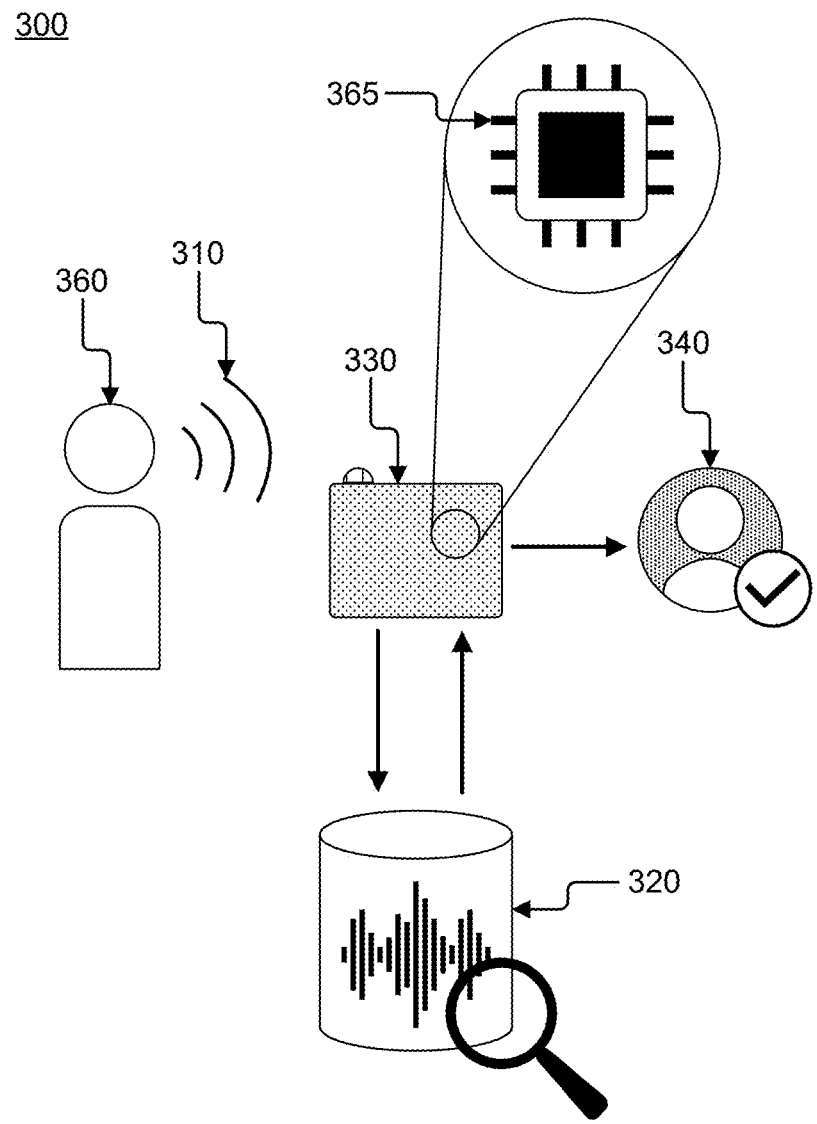
FIG. 3 illustrates an exemplary audio analytics system, according to some embodiments of the present disclosure.

Referring now to FIG. 3, an exemplary audio analytics system 300, according to some embodiments of the present disclosure, is illustrated. In some embodiments, the audio analytics system 300 may comprise at least one audio source 310. In some implementations, the audio analytics system 300 may comprise at least one database 320 and/or at least one storage medium 365. In some aspects, the audio analytics system 300 may be configured to identify or determine and subsequently present one or more origin characteristic results 340 associated with an origin 360 of the audio source 310. In some implementations, the origin characteristic results 340 may comprise one or more origin characteristics themselves or one or more results of a comparison between potential origin characteristics and expected origin characteristics, which may be helpful, for example and not limitation, when assessing potential fraudulent behavior.

In some embodiments, an audio capture device 330 may at least partially comprise at least one computing device. In some implementations, the audio capture device 330 may be communicatively coupled to at least computing device, such as via a wireless connection or a hardwired connection, as non-limiting examples. In some aspects, the audio capture device 330 may comprise at least one of: a peripheral device and a sensing device.

In some aspects, one or more audio characteristics of one or more sound waves produced by an audio source 310 may be captured by at least one audio capture device 330 and subsequently processed or analyzed by the audio analytics system 300. In some implementations, the audio capture device 330 may be communicatively coupled to at least one artificial intelligence infrastructure. In some non-limiting exemplary embodiments, the audio capture device 330 may comprise at least one artificial intelligence infrastructure. In some aspects, the artificial intelligence infrastructure may be configured to at least partially execute at least one operation on a captured audio source 310. In some implementations, the artificial intelligence infrastructure may be stored within one or more external or remote computing devices or servers that may be communicatively coupled to the audio capture device 330 via at least one network connection or via at least one direct connection. By way of example and not limitation, in some aspects, the artificial intelligence infrastructure may comprise at least one of: a neural network, a deep neural network, a convolutional neural network, and a support vector machine.

In some aspects, the audio capture device 330 may comprise at least a portion of or may be integrated with one or more audio-based products, such as a telephone system, smartphone, laptop computing device, hearing aid, or broadcast system, as non-limiting examples. By way of example and not limitation, an audio capture device 330 may comprise a smartphone programmed with one or more software applications that allows the smartphone to capture and process or otherwise analyze, for example and not limitation, a telephonic communication or other vocal interaction occurring between at least two people, or between at least one person and an audio recording, as non-limiting examples.

In some non-limiting exemplary implementations, an audio source 310 may be captured by at least one audio capture device 330 and cross-referenced with information or data contained in at least one database 320. In some aspects, the database 320 may be communicatively coupled to the audio capture device 330, such as via at least one network connection, or the audio capture device 330 may at least partially comprise the database 320. In some implementations, one or more audio characteristics of the audio source 310 may be identified via execution of a first at least one operation on the captured audio source 310 and a second at least one operation may be executed on the identified audio characteristic(s) to identify one or more potential origin characteristics associated with an origin 360 of the audio source 310. In some aspects, one or more operations may be executed on the audio source 310 to identify one or more potential origin characteristics of the origin 360 of the audio source without identifying any audio characteristics. In some implementations, one or more audio characteristics may be identified or determined for the audio source 310 by one or more processes or analytical methods that do not comprise executing at least one operation on the audio source 310. In some non-limiting exemplary embodiments, the first at least one operation may be at least partially executed by a first artificial intelligence infrastructure utilizing a first set of one or more parameters and the second at least one operation may be at least partially executed by a second artificial intelligence infrastructure utilizing a second set of one or more parameters. In some implementations, the first and the second at least one operation may be at least partially executed by the same artificial intelligence infrastructure using the same or different sets of one or more parameters.

In some non-limiting exemplary embodiments, the database 320 may comprise one or more physical memory components configured internally within the audio capture device 330, or the database 320 may comprise one or more external databases or servers to which the audio capture device 330 may be communicatively coupled, such as via wireless connectivity or via a direct wired connection. In some aspects, the database 320 may comprise at least one datum associated with one or more expected origin characteristics related to an origin 360 of a captured audio source 310 that may be compared to one or more potential origin characteristics identified for the origin 360 of the audio source 310 by the audio analytics system 300. In some non-limiting exemplary implementations, the database 330 may comprise a plurality of stored sound waves in the form of, for example and not limitation, audio samples from one or more previously stored or previously received audio sources 310 to use as a comparison for a captured audio source 310.

In some aspects, the database 320 may comprise one or more embeddings that may be at least temporarily stored therein, wherein each embedding may comprise a voiceprint correlating to a unique origin 360. In some non-limiting exemplary implementations, the database 320 may be associated with one or more third-party systems or software applications, wherein one or more voiceprints within the database 320 may be generated by such third-party systems or applications. In some embodiments, the audio analytics system 300 may be configured to execute at least one operation on a voiceprint generated by or received from any third-party source to identify one or more potential origin characteristics of the origin 360 of the voiceprint regardless of which third-party source generated the voiceprint. In some aspects, this may enable the audio analytics system 300 to identify an origin 360 of a first voiceprint generated by a first third-party source and match the first voiceprint to a second voiceprint generated by a second third-party source for the same origin 360 to identify one or more audio sources 310 emitted from the origin 360 within the second third-party system.

In some non-limiting exemplary implementations, the audio analytics system 300 may be configured to perform at least one comparative analysis to determine one or more origin characteristics results 340 for an audio source 310. In some non-limiting exemplary embodiments, the comparative analysis may at least partially comprise a direct or indirect comparison comprising one or more identified potential origin characteristics associated with an origin 360 of an audio source 310 that may be cross-referenced with one or more expected origin characteristics for the origin 360 that may be stored within the database 320. In some aspects, at least a portion of the expected origin characteristics may be at least partially identified from one or more audio samples previously stored within the database 320.

As a non-limiting illustrative example, a phone call between a person and a bank may be captured using at least one audio capture device 330, and the audio capture device 330 may facilitate the execution of a first at least one operation on a data stream comprising the caller's voice to identify one or more audio characteristics of the voice, after which a second at least one operation may be executed on the data stream to identify one or more potential origin characteristics of the caller. In some aspects, the identified potential origin characteristics may be cross-referenced against one or more expected origin characteristics within at least one database 320 to attempt to verify the identity of the caller. In some non-limiting exemplary implementations, the caller's voice may be directly compared to a plurality of voice recordings stored within the database 320 such that the audio analytics system 300 may attempt to match the caller's voice to at least one previously recorded voice sample obtained from the caller. For example, the database 320 may comprise one or more recordings of previous calls the caller made to the bank or other institutions, and the audio analytics system 300 may compare the caller's voice with those stored phone conversations to determine whether the caller is the same person as in the recordings. In some embodiments, the results of this determination may be presented via a user interface associated with the audio capture device 330 or another electronic or computing device associated with the audio analytics system 300.

As an additional non-limiting illustrative example, an individual may call a bank or other financial institution and claim to be the owner of one or more accounts. The bank records may indicate that the owner of the relevant account is a 65-year-old female, wherein the age and gender data may comprise actual expected origin characteristics of the account owner. In some aspects, the audio analytics system 300 may execute at least one operation on the data stream comprising the caller's voice to identify one or more potential origin characteristics associated with the caller. In some implementations, the audio analytics system 300 may then make a comparative determination between the identified potential origin characteristics of the caller's voice and the expected origin characteristics comprising the age and gender of the actual account holder stored within the database 320 to determine origin characteristic results 340 that may indicate whether the caller may be a 65-year-old female, wherein a negative determination may indicate that the caller may be engaging in fraudulent behavior. In some aspects, the origin characteristic results 340, as well as the assessment of fraud, may be presented via at least one user interface, which may enable an employee of the bank to quickly ascertain whether a risk of fraud is associated with the current call.

Figure 4A:
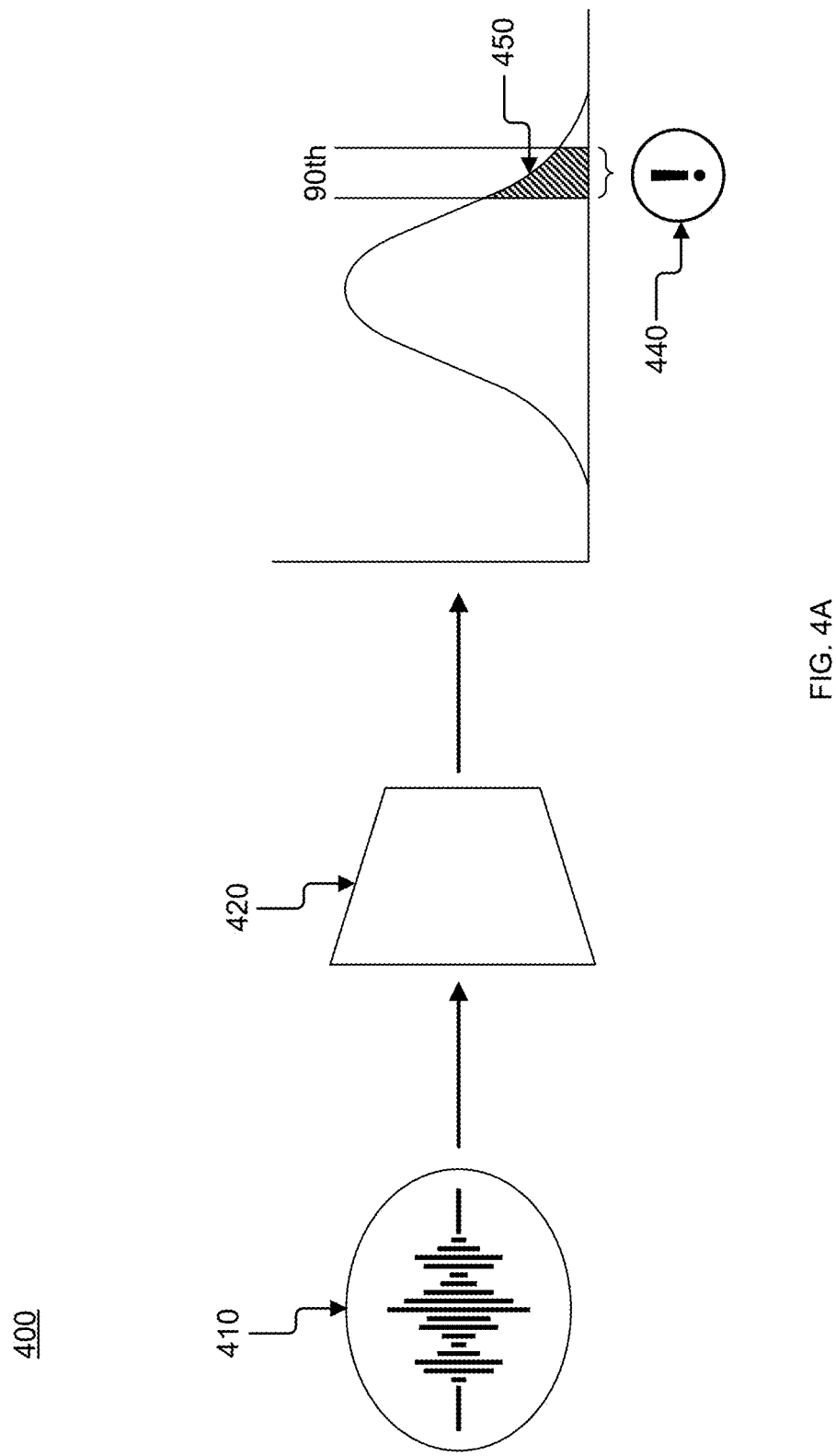
FIG. 4A illustrates exemplary scores of an audio analytics system, according to some embodiments of the present disclosure.
Figure 4B:
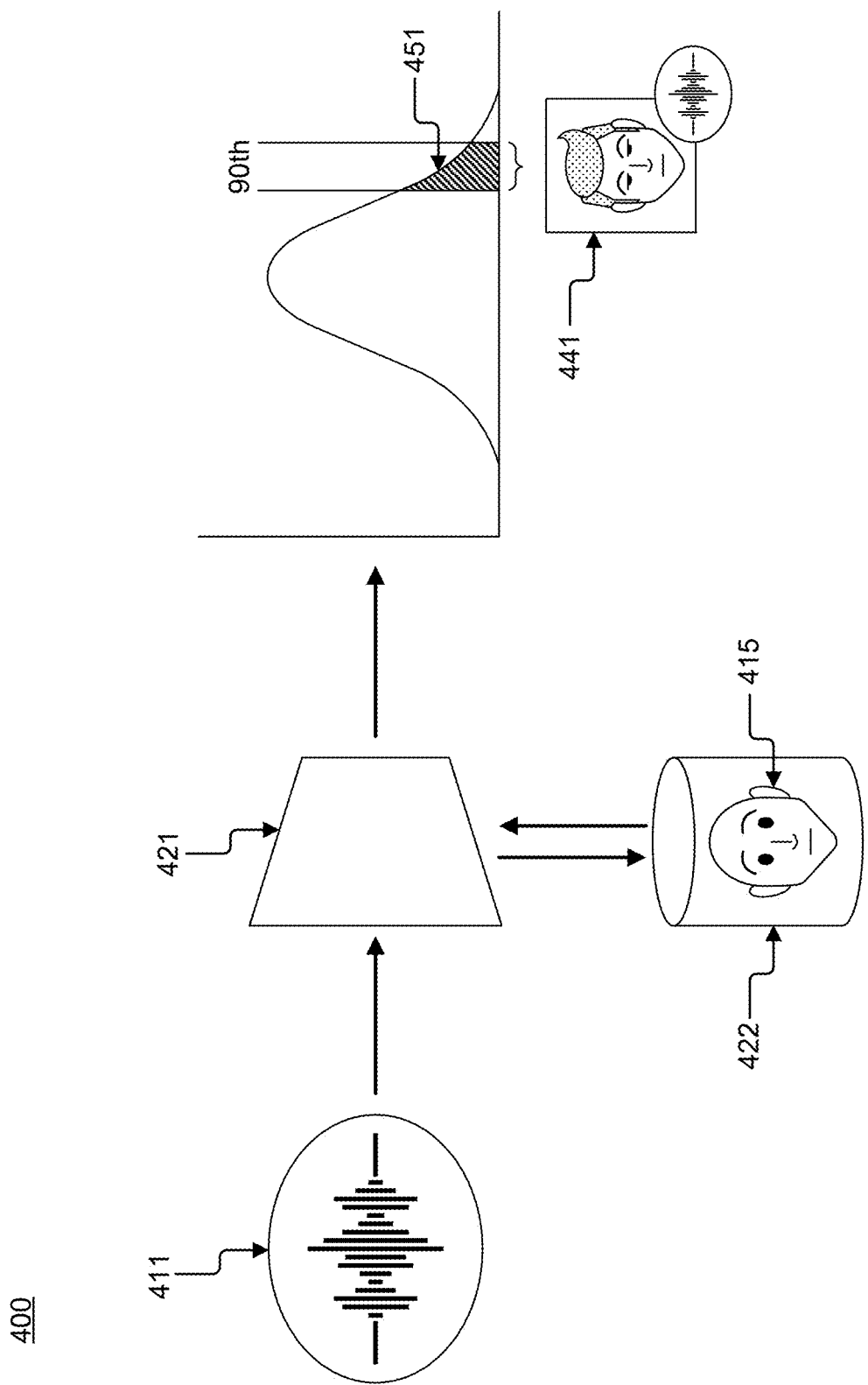
FIG. 4B illustrates exemplary scores of an audio analytics system, according to some aspects of the present disclosure.

Referring now to FIGS. 4A-B, exemplary scores 450, 451 of an audio analytics system 400, according to some embodiments of the present disclosure, are illustrated. In some aspects, the audio analytics system 400 may comprise at least one audio source 410, 411. In some embodiments, the audio analytics system 400 may comprise at least one visual source 415. In some implementations, the audio analytics system 400 may comprise one or more artificial intelligence infrastructures 420, 421. In some aspects, the audio analytics system 400 may be configured to compute one or more scores 450, 451 and present the scores 450, 451 via at least one user interface.

In some aspects, the audio analytics system 400 may comprise at least one audio source 410 and at least one artificial intelligence infrastructure 420. In some implementations, an audio source 410 may be captured and propagated through the artificial intelligence infrastructure 420, wherein one or more operations may be executed on the audio source 410 data as it is propagated to identify one or more potential origin characteristics 440 associated with the origin of the audio source 410. In some aspects, the audio analytics system 400 may be configured to compute, generate, and present one or more scores 450 that may be indicative of a confidence level associated with the potential origin characteristics 440 determined by the audio analytics system 400, including an identification of or an identity verification for the origin of the captured audio source 410. In some non-limiting exemplary embodiments, the scores 450 may represent a Bayesian likelihood that each of the potential origin characteristics 440 identified by the artificial intelligence infrastructure 420 is accurate, valid, or true. In some implementations, the scores 450 may be presented via at least one user interface, wherein the scores 450 may comprise a form that comprises at least one of: one or more bar graphs, one or more line graphs, a normal probability distribution or bell curve, a pie chart, a percentage, or a numerical rank, as non-limiting examples.

As a non-limiting illustrative example, data comprising an unknown person's voice may be propagated through an artificial intelligence infrastructure 420 to identify one or more potential origin characteristics 440 of the person, such as the person's identity. In some aspects, the identified potential origin characteristics 440 may comprise an exact identity for the person, while in other implementations the potential origin characteristics 440 may comprise several possible identities of varying likelihoods for the person that may be identified and presented by the audio analytics system 400. In some aspects, at least one confidence level may be determined by the audio analytics system 400 that may be indicative of an estimated accuracy associated with each possible identity for the unknown person identified by the audio analytics system 400, and this confidence level may be presented by the audio analytics system 400 in the form of, by way of example and not limitation, one or more scores 450.

In some implementations, a confidence score 450 may at least partially comprise a determination of at least one quality aspect of the audio source 410, wherein the score 450 may be at least partially affected by the quality of the audio source 410. By way of example and not limitation, if the audio source 410 comprises background noise that obscures the tone and frequency of the audio source 410, then the score 450 may reflect the low quality of the audio source 410. In some embodiments, the score 450 may at least partially comprise an expected accuracy associated with at least one of the identified potential origin characteristics 440 for the origin of the audio source 410. By way of example and not limitation, if an identified potential origin characteristic 440 comprises an age range for an origin of an audio source 410 that spans from 40 years old to 50 years old, and a high level of accuracy is expected for that age range, then the high expected accuracy may be reflected by an increased score 450.

In some implementations, the confidence score 450 may be dynamically determined for each of one or more audio samples received from one or more audio sources 410, wherein each audio sample may comprise, by way of example and not limitation, an amount of previously-recorded audio data or an amount of audio data streamed in substantially real time, as non-limiting examples. In some aspects, the score 450 may be at least partially based on one or more features or elements of a unique audio sample, such that the score 450 may increase or decrease based on the presence or absence of such features or elements.

By way of example and not limitation, the confidence score 450 may be at least partially based upon whether an audio sample comprises one or more of: at least one verbalization of one or more phonemes, an amount of background noise, one or more formatting or compression elements, one or more missing or lost data packets, a high or low signal clarity, a high or low amplitude, high or low energy, or one or more degradations in quality, as non-limiting examples. In some implementations, the score 450 may be at least partially determined by at least one artificial intelligence infrastructure. In some embodiments, the artificial intelligence infrastructure may be configured to analyze at least a portion of a spectrogram of an audio sample to identify the presence or absence of one or more features or elements that may at least partially affect the score 450.

As a non-limiting illustrative example, the phoneme that comprises the long "a" sound may be associated with one or more features of the neck of an origin of an audio source 410. In some aspects, an audio sample that comprises a high signal clarity and high energy for one or more occurrences of the long "a" phoneme may comprise a higher confidence score 450 than a similar audio sample that does not comprise such elements or features, as a non-limiting example.

In some implementations, the audio analytics system 400 may comprise at least one audio source 411. In some embodiments, the audio analytics system 400 may comprise at least one artificial intelligence infrastructures 421. In some aspects, the audio analytics system 400 may be configured to compute one or more scores 451 and present the scores 451 via at least one user interface. In some implementations, an audio source 411 may be captured and propagated through the artificial intelligence infrastructure 421, wherein one or more operations may be executed on the audio source 411 data as it is propagated to identify one or more potential origin characteristics 441 associated with the origin of the audio source 411. In some non-limiting exemplary embodiments, the identified potential origin characteristics 441 may comprise one or more visual physical features of the origin of the audio source 411. In some aspects, the identified visual physical features of the origin may be compared by the audio analytics system 400 to one or more visual sources 415 stored within at least one database 422 to determine whether the origin of the audio source 411 matches one or more of the stored visual sources 415. In some implementations, the results of such determination may be presented via at least one user interface.

In some embodiments, the audio analytics system 400 may comprise at least one audio source 411. In some implementations, the audio analytics system 400 may comprise at least one artificial intelligence infrastructure 421. In some aspects, the audio analytics system 400 may be configured to compute one or more scores 451 and present the scores 451 via at least one user interface. In some implementations, an audio source 411 may be captured and propagated through the artificial intelligence infrastructure 421, wherein at least one operation may be executed on the audio source 411 data as it is propagated to identify one or more potential origin characteristics 441 associated with the origin of the audio source 411. In some aspects, the audio source 411 may comprise one or more sound waves produced by humans or animals that may be associated with one or more origin characteristics that may comprise one or more visual physical attributes of a human or animal face or other portions of a human or animal body. By way of example and not limitation, various audio characteristics of human-produced or animal-produced sound waves may be indicative of potential origin characteristics 441 that may comprise one or more of: nasal cavity size and structure; mouth or nose shape; throat length or width; lung volume or lung condition; chest size; heart rate, blood pressure, or heart condition as derived from one or more detections pertaining to one or more carotid arteries within or near the neck; skull shape; skin tone; hair color; eye color; muscle tone; muscle condition; muscle responsiveness; jaw size or structure; or bone density, as non-limiting examples. In some implementations, a first at least one operation may be executed on the audio source 411 to identify one or more audio characteristics associated with the audio source 411, and a second at least one operation may be executed on the audio source 411 to identify one or more potential origin characteristics 441 comprising visual physical attributes of the origin of the audio source 411. In some aspects, the identified visual physical features of the origin may be compared by the audio analytics system 400 to one or more visual sources 415 stored within at least one database 422 to determine whether the origin of the audio source 411 matches one or more of the stored visual sources 415 to determine an actual or possible identity and/or a more complete visual appearance for the origin of the captured audio source 411. In some implementations, the results of such determination may be presented via at least one user interface.

As a non-limiting illustrative example, data comprising an unknown person's voice may be captured and propagated through at least one artificial intelligence infrastructure 421 to identify one or more potential origin characteristics 441 that may comprise one or more visual physical attributes of the person speaking that may be cross-referenced against one or more visual sources 415 stored within at least one database 422, wherein the stored visual sources 415 may comprise, by way of example and not limitation, a plurality of images or pictures of human faces, to identify one or more stored visual sources 415 that may have produced the captured voice recording. In some embodiments, the audio analytics system 400 may compute or generate at least one confidence level that may be indicative of a likelihood that the captured voice was in fact produced by one of the identified possible visual sources 415. In some aspects, the confidence level may be presented by the audio analytics system 400 via at least one user interface as one or more scores 451.

Referring now to FIG. 5, an exemplary audio analytics system 500, according to some embodiments of the present disclosure, is illustrated. In some aspects, the audio analytics system 500 may comprise at least one audio source 510. In some embodiments, the audio analytics system 500 may comprise at least one visual source 515. In some implementations, the visual source 515 may be used to at least partially generate the audio source 510, or the audio source may be used to at least partially generate the visual source 515.

In some non-limiting exemplary embodiments, the audio analytics system 500 may comprise at least one artificial intelligence infrastructure that may be at least partially trained by executing a first at least one operation on one or more training sources to generate an embedding for the origin of each training source that comprises an identification of a first set of one or more potential characteristics associated with the origins the training sources, wherein a second at least one operation may be executed on the training sources to identify a second set of one or more potential origin characteristics associated with the training source origins, wherein the identified potential origin characteristics may comprise one or more visual physical attributes of a human or animal, such as, by way of example and not limitation, nasal cavity size or structure; mouth or nose shape; throat length or width lung volume or lung condition; chest size; heart rate, blood pressure, or heart condition as derived from one or more detections pertaining to one or more carotid arteries within or near the neck; skull shape; skin tone; hair color; eye color; muscle tone; muscle condition; muscle responsiveness; jaw size or structure; or bone density, as non-limiting examples. In some aspects, once the artificial intelligence infrastructure has been trained to identify such potential origin characteristics, the audio analytics system 500 may be able to analyze at least one visual source 515 and determine the types of sound waves that may be produced by an origin of an audio source 510 that may comprise visual physical attributes substantially similar to those of the visual source 515, thereby giving an indication of what the visual source 515 may sound like.

As a non-limiting illustrative example, a picture of a person's face may be provided to the audio analytics system 500 as a visual source 515. In some implementations, the picture may then be used by the audio analytics system 500 to analyze the bone and/or soft tissue structure of the face and other physical facial attributes and visual physical structures, along with projected or estimated internal structural features pertaining to the subject's face, soft tissue(s), check bone(s), nose, mandible, throat, or vocal cords. In some aspects, the audio analytics system 500 may use the results of the analysis to generate an audio source 510 that may comprise a calculated estimation of what the person's voice may sound like based on the visual physical attributes of the visual source 515.

In some implementations, the audio analytics system 500 may be configured to receive an audio source 510 and generate a rendering of a visual source 515 that may comprise a calculated estimation of the appearance of one or more visual physical attributes of a human or animal that produced the audio source 510. In some aspects, by being configured to associate one or more audio characteristics of the audio source 510 with potential origin characteristics that comprise visual physical attributes, the audio analytics system 500 may be able to process or analyze the audio source 510 to identify one or more potential origin characteristics of the origin of the audio source 510 that comprise visual physical attributes, and then compile the identified visual physical attributes to generate a rendered visual source 515 of the origin. In some embodiments, the generated visual source 515 may be presented via at least one user interface.

As a non-limiting illustrative example, a person may rob a convenience store while wearing a face mask. The robbery may be recorded by a plurality of security cameras with integrated microphones. Although the person's face may be imperceivable due to the mask, the person's voice may be processed or analyzed by the audio analytics system 500 to identify one or more potential origin characteristics that comprise visual physical attributes of the person's face such that the audio analytics system 500 may be able to generate a rendered visual source 515 of the person's face that may be presented via a user interface, thereby giving law enforcement officials a starting basis to begin a search for the suspect who committed the robbery.

In some aspects, the audio analytics system 500 may be configured to execute at least one query or search based at least partially on at least one audio source 510 or at least one visual source 515. In some non-limiting exemplary embodiments, a user may use a user interface associated with the audio analytics system 500 to upload, submit, or stream an audio source 510, and the audio analytics system 500 may process or analyze the audio source 510 to search for similar audio sources 510 stored within the audio analytics system 500 or accessible by the audio analytics system 500 via at least one network or broadcast connection or to search for one or more visual sources 515 that may have emitted the audio source 510. In some non-limiting exemplary implementations, one or more user interfaces of the audio analytics system 500 may be configured to allow a user to upload or submit at least ore visual source 515, which may enable the audio analytics system 500 to search internally or externally for similar visual sources 515 or for audio source(s) 510 that may have been emitted by the visual source 515.

As a non-limiting illustrative example, an individual user may receive a threatening voicemail from an unknown caller. In an effort to determine the caller's identity, the user may use an audio analytics system 500 configured for use with the user's smartphone, wherein the audio analytics system 500 may process or analyze the voicemail message to identify one or more potential origin characteristics comprising visual physical attributes of the caller's face, thereby allowing the audio analytics system 500 to generate a rendering of visual source 515 that may be indicative of the caller's appearance. The audio analytics system 500 may then use the generated visual source 515 to search social media networks and other compilations of images, videos, and photographs to attempt to find an at least partial match to the generated visual source 515 and thereby identify the caller.

Figure 6A:
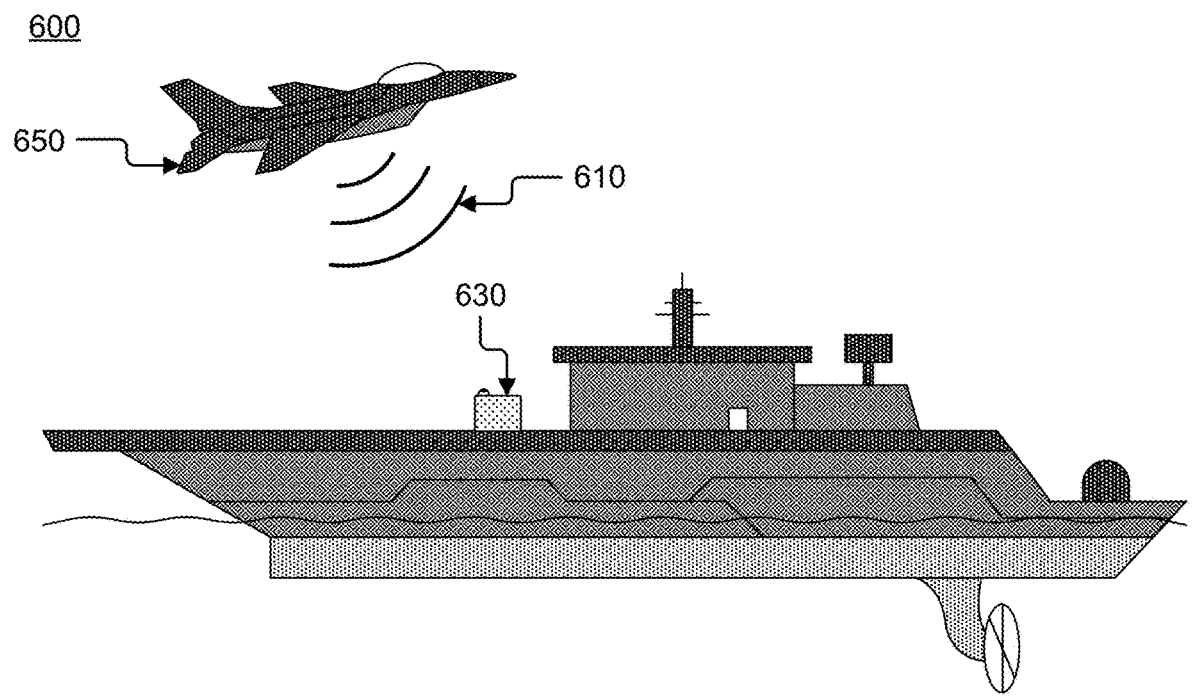
FIG. 6A illustrates an exemplary audio analytics system, according to some embodiments of the present disclosure.
Figure 6B:
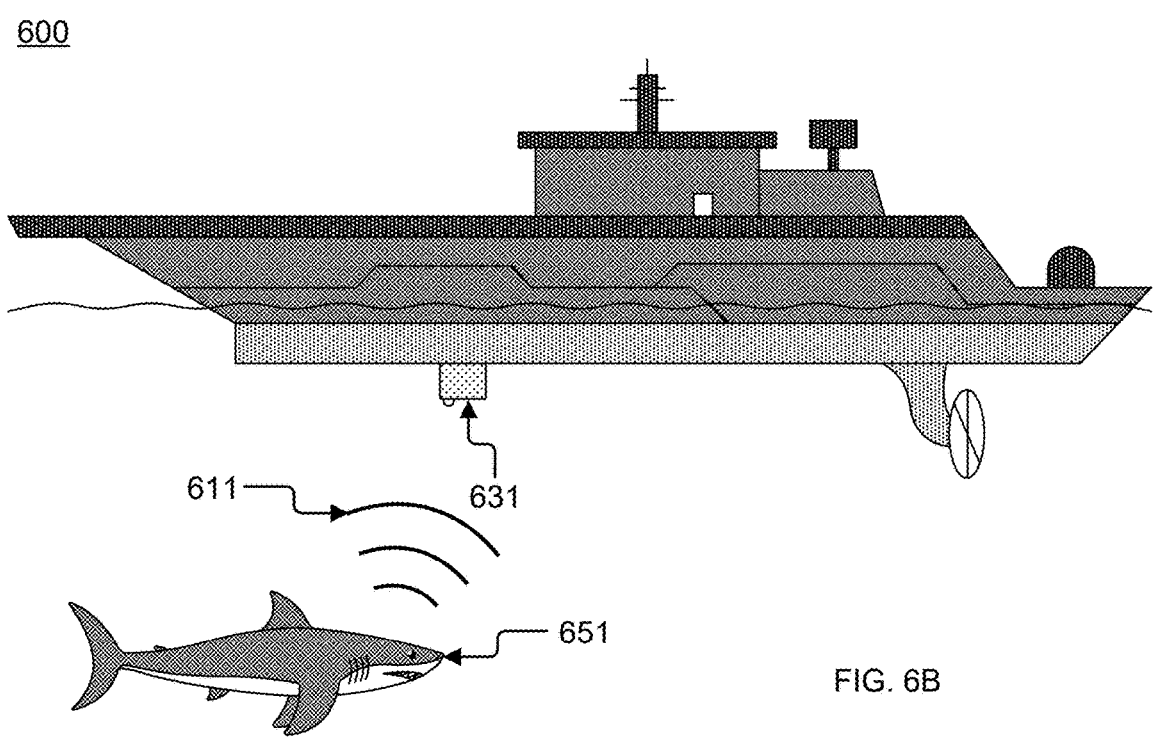
FIG. 6B illustrates an exemplary audio analytics system, according to some embodiments of the present disclosure.

Referring now to FIGS. 6A-B, an exemplary audio analytics system 600, according to some embodiments of the present disclosure, is illustrated. In some aspects, the audio analytics system 600 may comprise at least one audio source 610, 611 emitted from at least one origin 650, 651. In some implementations, the audio analytics system 600 may comprise at least one audio capture device 630, 631. In some embodiments the audio analytics system 600 may be configured as a substantially independent system, wherein the audio analytics system 600 may be substantially isolated from external servers and public networks.

In some embodiments, the audio analytics system 600 may comprise one or more databases or other memory resources configured to store at least one localized artificial intelligence infrastructure trained to execute one or more operations on one or more locally-received audio sources 610, 611. In some non-limiting exemplary implementations, the audio analytics system 600 may be configured to operate without a connection to a data cloud, or any form of a wireless data connection.

In some aspects, the closed-loop nature of a self-contained audio analytics system 600 may allow the audio analytics system 600 to be used in remote locations and scenarios wherein utilizing a wired or wireless connection to a public network or one or more external servers may be limiting, impractical, or infeasible, such as on a coast guard rescue vessel located miles from shore, as a non-limiting example.

As a non-limiting illustrative example, at least one audio capture device 630, 631 may be located on a naval vessel to capture and process or analyze one or more various audio sources 610, 611. By way of example and not limitation, a military naval vessel may comprise one or more audio capture devices 630 configured on the deck or other exterior surface of the vessel. This configuration may allow the audio capture device 630 to capture and process or analyze audio sources 610, 611 emitted from origins 650, 651 that may be surrounding or approaching the vessel. The audio analytics system 600 may process the audio locally within the isolated audio analytics system 600.

As another non-limiting illustrative example, an audio capture device 630 configured on the deck or other exterior portion of a vessel may be configured to capture audio sources 610 emitted from origins 650 in the form of aircraft to enable the audio analytics system 600 to process or analyze the audio sources 610. As each unique aircraft has its own unique audio signature, the audio analytics system 600 may be trained to process audio produced by an approaching aircraft and identify one or more potential origin characteristics that comprise an identity of the aircraft before human ears or other forms of radar and detection may be able to do so.

As an additional non-limiting example, an audio capture device 631 may be configured on the bottom portion of the hull of a naval or other marine vessel to capture audio sources 611 that may be underwater so that the audio analytics system 600 may process or analyze the audio sources 611. In this configuration, the audio capture device 631 may be able to capture audio sources 611 emitted from origins 651 in the water surrounding or approaching the vessel, such as, for example and not limitation, audio sources 611 from origins 651 in the form of other vessels in the water or animals. The audio from animals and other vessels may then be captured and analyzed by the audio analytics system 600 to identify one or more potential origin characteristics that comprise an identification of the vessels or animals.

To further illustrate the previous example, the audio analytics system 600 may be trained to identify one or more potential origin characteristics that comprise an identity of the origin 651 of one or more audio sources 631 that comprise underwater sounds. In some aspects, this may enable the audio analytics system 600 to receive an audio source 631 from an unknown underwater origin 651 via an audio capture device 631 to determine that the audio source 611 is being emitted from an origin 651 that comprises a shark and not a submarine, as a non-limiting example.

Figure 7:
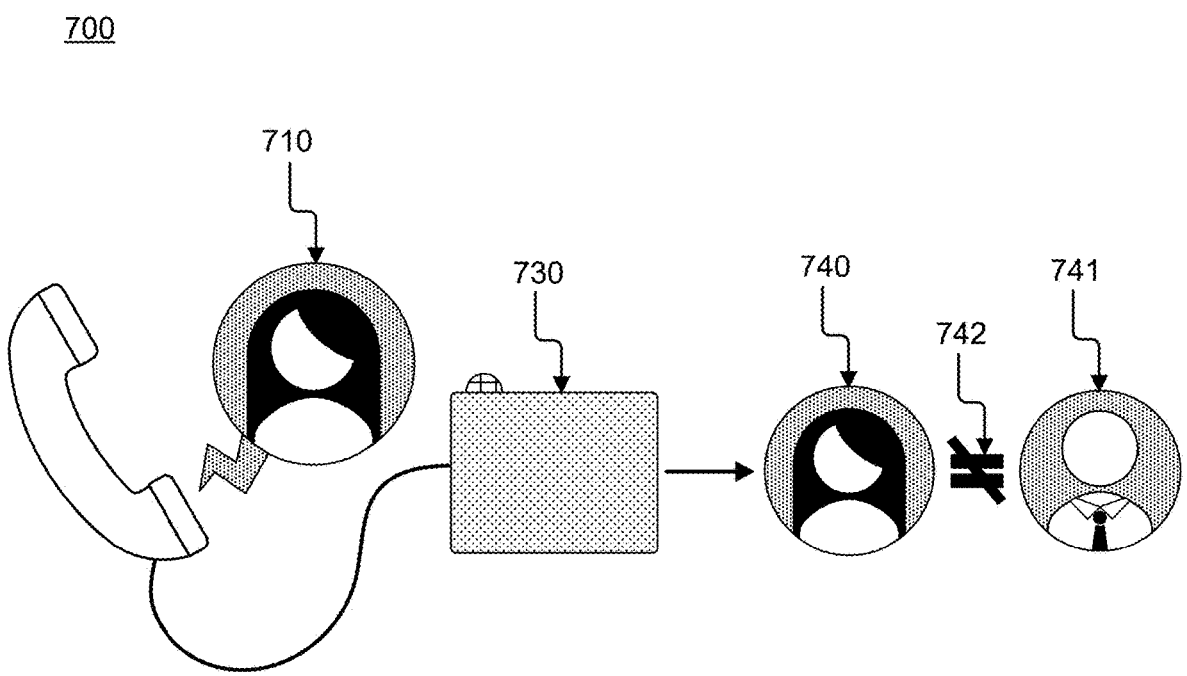
FIG. 7 illustrates an exemplary origin characteristic result determined by an audio analytics system, according to some embodiments of the present disclosure.

Referring now to FIG. 7, an exemplary origin characteristic result 742 determined by an audio analytics system 700, according to some embodiments of the present disclosure, is illustrated. In some aspects, the audio analytics system 700 may comprise at least one audio source 710. In some implementations, the audio analytics system 700 may comprise at least one audio capture device 730. In some embodiments, the audio analytics system 700 may be configured to identify and present one or more potential origin characteristics 740 or expected origin characteristics 741 associated with an origin of the audio source 710.

By way of example and not limitation, an audio source 710 may comprise a person's voice on a phone call, wherein the audio capture device 730 may be integrated with or communicatively coupled to the phone, either wirelessly or via a direct wired connection, to capture the person's voice. In some non-limiting exemplary embodiments, the audio capture device 730 may comprise the phone itself, which may comprise a smartphone, as a non-limiting example. In some aspects, the audio capture device 730 may comprise at least one storage medium, wherein the storage medium may comprise one or more parameters that may be utilized to at least partially execute at least one operation on the captured audio source 710. By way of example and not limitation, the parameter(s) within the storage medium may comprise one or more weights, biases, or similar values, modifiers, or inputs. In some non-limiting exemplary embodiments, at least a portion of the parameter(s) may be adjustable to modify the accuracy of one or more potential origin characteristics 740 that may be identified via the execution of the at least one operation on the audio source 710.

In some implementations, the audio capture device 730 may be communicatively coupled to at least one artificial intelligence infrastructure. In some non-limiting exemplary embodiments, the audio capture device 730 may comprise at least one artificial intelligence infrastructure. In some aspects, the artificial intelligence infrastructure may be configured to at least partially execute the at least one operation on the captured audio source 710. By way of example and not limitation, in some aspects, the artificial intelligence infrastructure may comprise at least one of: a neural network, a deep neural network, a convolutional neural network, and a support vector machine.

In some aspects, the audio analytics system 700 may be configured to identify one or more audio characteristics of the captured audio source 710. In some implementations, the audio characteristic(s) may be identified via execution of a first at least one operation on the received audio source 710 and a second at least one operation may be executed on the identified audio characteristic(s) to identify the potential origin characteristic(s) 740 associated with an origin of the audio source 710. In some embodiments, the audio analytics system 700 may be configured to execute one or more operations directly on the audio source 710 to identify one or more potential origin characteristics 740 of the origin.

As a non-limiting illustrative example, the audio analytics system 700 may be implemented as a security measure to help prevent individuals from being victimized by fraud. For instance, a bad actor may call an elderly person claiming to be the person's grandson and ask for money. As a security precaution, an audio capture device 730 in the form of the person's phone or integrated with the person's phone system may receive the caller's voice to enable the audio analytics system 700 to process the voice data to attempt to verify the identity of the caller and determine whether the caller is actually the grandson of the person being called. In some aspects, this determination may at least partially comprise a comparative analysis between one or more identified potential origin characteristics 740 of the caller and one or more expected origin characteristics 741 identified from a previously captured and stored voiceprint of the actual grandson, wherein the expected origin characteristics 741 may comprise the identity of the grandson. In some embodiments, the comparative analysis performed by the audio analytics system 700 may generate one or more origin characteristic results 742 that may be presented via at least one user interface, such as, for example and not limitation, upon a display screen of a smartphone used by the elderly person during the call.

In some non-limiting exemplary implementations, the origin characteristic results 742 may comprise a determination that the bad actor is not the grandson of the person being called. In some non-limiting exemplary embodiments, the audio analytics system 700 may be configured to perform or instigate one or more remedial actions to prevent the bad actor from successfully completing the fraudulent act, such as ending the call, alerting the person being called of the determined security risk, alerting the police or other relevant authorities, and/or alerting a third-party security company or fraud prevention organization, as non-limiting examples.

As another non-limiting illustrative example, an unknown person's voice may be captured and processed or analyzed during a phone call with an insurance agency, bank, or other financial institution or business entity. In some aspects, by way of example and not limitation, at least one audio capture device 730 may be directly or indirectly integrated with the financial institution's phone system such that the audio capture device 730 may be configured to capture the caller's voice and enable the audio analytics system 700 to execute one or more operations on the voice data to identify one or more potential origin characteristics 740 of the caller to determine the identity of the caller or verify the identity of the caller to confirm that the caller is the actual policy holder of the relevant policy or account, wherein such identify determination or verification may be presented to one or more employees of the financial institution via at least one user interface. In some aspects, at least one phone used by the financial institution may comprise the audio capture device 730.

In some non-limiting exemplary embodiments, by retrieving a voiceprint of the actual policy or account holder stored in at least one database or accessing such voiceprint from a data stream or file via at least one network connection, the audio analytics system 700 may execute one or more operations on the voiceprint to identify one or more expected origin characteristics 741 of the policy or account holder, and by comparing the expected origin characteristics 741 to one or more identified potential origin characteristics 740 associated with the unknown caller, the audio analytics system 700 may be able to generate one or more origin characteristic results 742 that may comprise a determination that the caller is not the rightful owner of the relevant policy or account.

In some non-limiting exemplary implementations, a determination of a fraudulent caller may cause the audio analytics system 700 to perform or instigate one or more remedial actions to prevent any type of fraud from occurring, such as ending the call, alerting the financial institution of the potential security risk, alerting the police or other relevant authorities, and/or alerting a third-party security company or fraud prevention organization, as non-limiting examples. In some aspects, by using a voiceprint analysis to verify the identity of a policy or account owner, the audio analytics system 700 may provide enhanced security by requiring more than general account information and knowledge of a policy or account owner's personal details to access the relevant policy or account.

Figure 8:
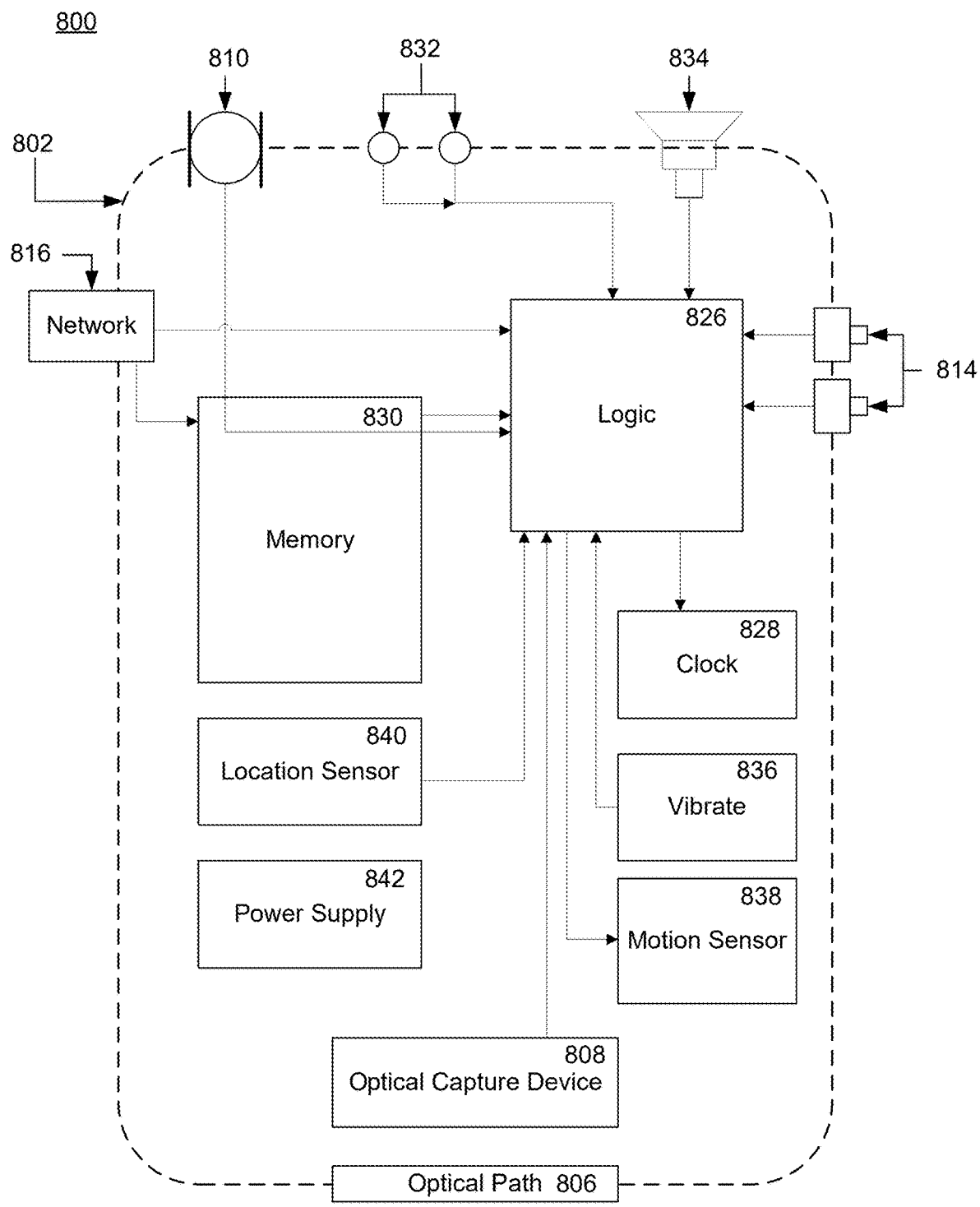
FIG. 8 illustrates a block diagram of an exemplary computing device that may at least partially comprise an audio analytics system, according to some embodiments of the present disclosure.

Referring now to FIG. 8, a block diagram of an exemplary computing device 802 that may at least partially comprise an audio analytics system, according to some embodiments of the present disclosure, is illustrated. The computing device 802 may comprise an optical capture device 808, which may capture an image and convert it to machine-compatible data, and an optical path 806, typically a lens, an aperture, or an image conduit to convey the image from the rendered document to the optical capture device 808. The optical capture device 808 may incorporate a Charge-Coupled Device (CCD), a Complementary Metal Oxide Semiconductor (CMOS) imaging device, or an optical sensor of another type.

In some embodiments, the computing device 802 may comprise a microphone 810, wherein the microphone 810 and associated circuitry may convert the sound of the environment, including spoken words, into machine-compatible signals. Input facilities 814 may exist in the form of buttons, scroll-wheels, or other tactile sensors such as touchpads. In some embodiments, input facilities 814 may include a touchscreen display. Visual feedback 832 to the user may occur through a visual display, touchscreen display, or indicator lights. Audible feedback 834 may be transmitted through a loudspeaker or other audio transducer. Tactile feedback may be provided through a vibration module 836.

In some aspects, the computing device 802 may comprise a motion sensor 838, wherein the motion sensor 838 and associated circuitry may convert the motion of the computing device 802 into machine-compatible signals. For example, the motion sensor 838 may comprise an accelerometer, which may be used to sense measurable physical acceleration, orientation, vibration, and other movements. In some embodiments, the motion sensor 838 may comprise a gyroscope or other device to sense different motions.

In some implementations, the computing device 802 may comprise a location sensor 840, wherein the location sensor 840 and associated circuitry may be used to determine the location of the device. The location sensor 840 may detect Global Position System (GPS) radio signals from satellites or may also use assisted GPS where the computing device 802 may use a cellular network to decrease the time necessary to determine location.

In some embodiments, the location sensor 840 may use radio waves to determine the distance from known radio sources such as cellular towers to determine the location of the computing device 802. In some embodiments these radio signals may be used in addition to and/or in conjunction with GPS.

In some aspects, the computing device 802 may comprise a logic module 826, which may place the components of the computing device 802 into electrical and logical communication. In some implementations, the electrical and logical communication may allow the components to interact. In some embodiments, the received signals from the components may be processed into different formats and/or interpretations to allow for the logical communication.

The logic module 826 may be operable to read and write data and program instructions stored in associated storage 830, such as RAM, ROM, flash, or other suitable memory. In some aspects, the logic module 826 may read a time signal from the clock unit 828. In some embodiments, the computing device 802 may comprise an on-board power supply 842. In some embodiments, the computing device 802 may be powered from a tethered connection to another device, such as a Universal Serial Bus (USB) connection.

In some implementations, the computing device 802 may comprise a network interface 816, which may allow the computing device 802 to communicate and/or receive data to a network and/or an associated computing device. The network interface 816 may provide two-way data communication. For example, the network interface 816 may operate according to an internet protocol.

As another example, the network interface 816 may comprise a local area network (LAN) card, which may allow a data communication connection to a compatible LAN. As another example, the network interface 816 may comprise a cellular antenna and associated circuitry, which may allow the computing device 802 to communicate over standard wireless data communication networks. In some implementations, the network interface 816 may comprise a Universal Serial Bus (USB) to supply power or transmit data. In some embodiments, other wireless links known to those skilled in the art may also be implemented.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

Reference in this specification to "one embodiment," "an embodiment," any other phrase mentioning the word "embodiment", "aspect", or "implementation" means that a particular feature, structure, or characteristic described in connection with the embodiment is included in at least one embodiment of the disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional.

Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

In a preferred embodiment of the present invention, functionality is implemented as software executing on a server that is in connection, via a network, with other portions of the system, including databases and external services. The server comprises a computer device capable of receiving input commands, processing data, and outputting the results for the user. Preferably, the server consists of RAM (memory), hard disk, network, central processing unit (CPU). It will be understood and appreciated by those of skill in the art that the server could be replaced with, or augmented by, any number of other computer device types or processing units, including but not limited to a desktop computer, laptop computer, mobile or tablet device, or the like. Similarly, the hard disk could be replaced with any number of computer storage devices, including flash drives, removable media storage devices (CDs, DVDs, etc.), or the like.

The network can consist of any network type, including but not limited to a local area network (LAN), wide area network (WAN), and/or the internet. The server can consist of any computing device or combination thereof, including but not limited to the computing devices described herein, such as a desktop computer, laptop computer, mobile or tablet device, as well as storage devices that may be connected to the network, such as hard drives, flash drives, removable media storage devices, or the like.

The storage devices (e.g., hard disk, another server, a NAS, or other devices known to persons of ordinary skill in the art), are intended to be nonvolatile, computer readable storage media to provide storage of computer-executable instructions, data structures, program modules, and other data for the mobile app, which are executed by CPU/processor (or the corresponding processor of such other components). There may be various components of the present invention that are stored or recorded on a hard disk or other like storage devices described above, which may be accessed and utilized by a web browser, mobile app, the server (over the network), or any of the peripheral devices described herein. One or more of the modules or steps of the present invention also may be stored or recorded on the server, and transmitted over the network, to be accessed and utilized by a web browser, a mobile app, or any other computing device that may be connected to one or more of the web browser, mobile app, the network, and/or the server.

References to a "database" or to "database table" are intended to encompass any system for storing data and any data structures therein, including relational database management systems and any tables therein, non-relational database management systems, document-oriented databases, NoSQL databases, or any other system for storing data.

Software and web or internet implementations of the present invention could be accomplished with standard programming techniques with logic to accomplish the various steps of the present invention described herein. It should also be noted that the terms "component," "module," or "step," as may be used herein, are intended to encompass implementations using one or more lines of software code, macro instructions, hardware implementations, and/or equipment for receiving manual inputs, as will be well understood and appreciated by those of ordinary skill in the art. Such software code, modules, or elements may be implemented with any programming or scripting language such as C, C++, C#, Java, Cobol, assembler, PERL, Python, PHP, or the like, or macros using Excel or other similar or related applications with various algorithms being implemented with any combination of data structures, objects, processes, routines or other programming elements.

What is claimed is:

1. A method for a machine learning process, comprising:
   training at least one artificial intelligence infrastructure using at least one training datum, wherein the training datum is derived from at least one training source, wherein the training source is at least one type or form of sound or audio that comprises one or more sound waves;
   propagating training data through at least one artificial intelligence infrastructure, wherein the at least one artificial intelligence infrastructure comprises at least one layer, wherein the at least one layer includes at least one input layer, at least one output layer, and one or more hidden intermediate layers, wherein the at least one layer includes one or more nodes, wherein the one or more nodes of at least one layer connects to the one or more nodes of an at least one second layer to create one or more channels, wherein the one or more channels are assigned a numerical value, wherein a collective of the one or more channels comprise one or more parameters of the at least one artificial intelligence infrastructure;
   identifying at least one origin characteristic of the training data as it moves through the at least one artificial intelligence infrastructure, wherein the at least one artificial intelligence infrastructure comprises a first at least one artificial intelligence infrastructure that generates an embedding for a first set of potential origin characteristics within the one or more parameters generated by the collective of the one or more channels, wherein the numerical value comprises a calculated estimated accuracy of at least one origin characteristic, wherein the one or more embeddings include a voiceprint correlating to a unique origin, and wherein identifying at least one origin characteristic associated with the unique origin of an audio source by executing at least one operation directly on the audio source without first identifying any audio characteristics.

2. The method of claim 1, wherein the method further comprises:
   training a second at least one artificial intelligence infrastructure using at least one datum of training data, wherein the training datum is derived from at least one training source, wherein the training source includes one or more sound waves.

3. The method of claim 2, wherein the method further comprises:
propagating training data through a second at least one artificial intelligence infrastructure, wherein the second at least one artificial intelligence infrastructure comprises at least one input layer, at least one output layer, and one or more hidden intermediate layers.

4. The method of claim 3, wherein the method further comprises:
identifying at least one origin characteristic of the training data as it moves through the second at least one artificial intelligence infrastructure, wherein the second at least one artificial intelligence infrastructure generates an embedding for a second set of potential origin characteristics.

5. The method of claim 2, wherein a first at least one artificial intelligence infrastructure is a convolutional neural network and the second at least one artificial intelligence infrastructure is a multilayer perceptron.

6. The method of claim 1, wherein the training sources are animal sounds.

7. The method of claim 6, wherein the animal sounds are propagated through a first intelligence structure artificial intelligence infrastructure, wherein at least one operation is executed on the training data to identify the first set of origin characteristics that include one or more physical, mental, and emotional characteristics of an animal.

8. The method of claim 7, wherein the animal sounds are propagated through a second artificial intelligence infrastructure, wherein the at least one operation is executed on each embedding to identify one or more attributes of the animal sounds, wherein such attributes comprise a second set of potential origin characteristics.

9. The method of claim 8, wherein the artificial intelligence infrastructures learn to identify potential origin characteristics of the animal sounds, wherein a new training source is processed using the learned identification of a previous training source.

10. The method of claim 1, wherein the method further comprises:
determining accuracy of one or more potential origin characteristics identified for each training source received by the at least one artificial intelligence infrastructure with an execution of at least one loss function.

11. The method of claim 10, wherein the at least one loss function is configured to determine classification loss and regression for each identified potential origin characteristic.

12. The method of claim 11, wherein the at least one artificial intelligence infrastructure is trained to accurately predict at least one distribution range for one or more of the potential origin characteristics.

13. The method of claim 11, wherein the at least one loss function at least partially includes at least one linear quadratic estimation algorithm.

14. The method of claim 1, wherein the machine learning process receives the training sources from at least one audio capture device.

15. The method of claim 1, wherein the at least one artificial intelligence infrastructure is stored within one or more external or remote computing devices or services that are coupled to the audio capture device via at least one network connection.

16. The method of claim 1, wherein the at least one artificial intelligence infrastructure is stored within one or more external or remote computing devices or servers that are communicatively coupled to the audio capture device directly without network connection.

17. The method of claim 1, wherein the at least one artificial intelligence infrastructure includes at least one of: a neural network, a deep neural network, a convolutional neural network, or a support vector machine.

18. The method of claim 1, further including:
generating one or more scores indicative of a confidence level associated with the potential origin characteristics, wherein the one or more scores represent a Bayesian likelihood that each of the identified origin characteristics are accurate.

19. The method of claim 1, wherein the unique origin is one or more third-party systems or software applications, wherein the at least one artificial intelligence infrastructure is configured to execute at least one operation on the voiceprint generated by the unique origin to identify one or more potential origin characteristics of the unique origin.

20. The method of claim 1, wherein the at least one artificial intelligence infrastructure is configured to analyze at least one visual source, wherein results of the analysis are used to generate an estimation of visual physical attributes of an audio source.

* * * * *